United States Patent
Jiang et al.

(10) Patent No.: US 11,947,817 B2
(45) Date of Patent: Apr. 2, 2024

(54) MEMORY MAPPING TO ENHANCE DATA CUBE PERFORMANCE

(71) Applicant: MicroStrategy Incorporated, Vienna, VA (US)

(72) Inventors: Qianping Jiang, Vienna, VA (US); Cheng Guo, Herndon, VA (US); Rixin Liao, Herndon, VA (US); Cezary Raczko, Ashburn, VA (US); Xiaoyan Yu, Annandale, VA (US)

(73) Assignee: MicroStrategy Incorporated, Vienna, VA (US)

( * ) Notice: Subject to any disclaimer, the term of this patent is extended or adjusted under 35 U.S.C. 154(b) by 210 days.

(21) Appl. No.: 17/526,475

(22) Filed: Nov. 15, 2021

(65) Prior Publication Data

US 2023/0152994 A1    May 18, 2023

(51) Int. Cl.
*G06F 3/06* (2006.01)

(52) U.S. Cl.
CPC .......... *G06F 3/0635* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,421,562 B2 | 9/2008 | Bhatt et al. | |
| 7,647,471 B2 | 1/2010 | Hastings et al. | |
| 8,577,989 B2 | 11/2013 | Broda | |
| 8,909,680 B1 * | 12/2014 | Stolte | G06F 16/24552 |
| | | | 707/810 |
| 9,116,800 B2 | 8/2015 | Post et al. | |
| 9,118,698 B1 | 8/2015 | Radovanovic | |
| 9,658,878 B2 | 5/2017 | Ports et al. | |
| 9,773,029 B2 * | 9/2017 | Kulkarni | G06F 16/288 |
| 9,916,095 B2 | 3/2018 | Stabrawa et al. | |

(Continued)

OTHER PUBLICATIONS

Chen, Rong, et al., Tiled-MapReduce: Optimizing Resource Usages of Data-parallel Applications on Multicore with Tiling, PACT' 10, Sep. 11-15, 2010 (Year: 2010).*

(Continued)

*Primary Examiner* — Arpan P. Savla
*Assistant Examiner* — Edmund H Kwong
(74) *Attorney, Agent, or Firm* — Fish & Richardson P.C.

(57) ABSTRACT

Methods, systems, and apparatus, including computer programs encoded on computer-storage media, for memory mapping to enhance data cube performance. In some implementations, a system accesses a data set that includes data to be processed into a data cube. The system generates a memory-mapped data cube that includes a plurality of files including different segments of the data cube. Generating the memory-mapped data cube includes allocating memory-mapped buffers in non-volatile data storage and responding to subsequent memory allocation requests with addresses for the buffers such that components of the data cube are accumulated in the buffers. The memory-mapped data cube is loaded by storing the files of the data cube in disk-based (Continued)

storage, mapping the stored files of the data cube to virtual memory addresses, and caching portions of the data cube in random-access memory.

20 Claims, 8 Drawing Sheets

(56) References Cited

U.S. PATENT DOCUMENTS

| | | | |
|---|---|---|---|
| 10,310,747 B2 | 6/2019 | Owa et al. | |
| 10,515,018 B2 | 12/2019 | Huang et al. | |
| 10,824,362 B2 | 11/2020 | Voigt et al. | |
| 2007/0203933 A1* | 8/2007 | Iversen | G06F 16/283 707/999.102 |
| 2008/0005499 A1* | 1/2008 | McDonnell | G06F 9/544 711/154 |
| 2019/0004979 A1* | 1/2019 | Scott | G06F 9/30189 |
| 2019/0286638 A1 | 9/2019 | Walker et al. | |
| 2020/0004868 A1* | 1/2020 | Rao | G06F 16/2379 |

OTHER PUBLICATIONS

BrunoCalza.me [online], "But how, exactly, databases use mmap?" Jan. 19, 2021, retrieved on Aug. 30, 2022, retrieved from URL <https://brunocalza.me/but-how-exactly-databases-use-mmap/>, 11 pages.

BryanBrandow.com [online], "Moving Cubes," available on May 3, 2013, via Internet Archive: Wayback Machine URL <http://web.archive.org/web/20130901150920/http://www.bryanbrandow.com/2013/05/moving-cubes.html>, retrieved on Aug. 30, 2022, URL <http://www.bryanbrandow.com/2013/05/moving-cubes.html>, 3 pages.

Crotty et al., "Are You Sure You Want to Use MMAP in Your Database Management System?" 2022 Conference on Innovative Data Systems Research (CIDR'22), Jan. 2022, 7 pages.

MicroStrategy.com [online], "Edit All Server-Level Settings," upon information and belief, available no later than Dec. 27, 2019, retrieved on Aug. 30, 2022, retrieved from URL ,https://www2.microstrategy.com/producthelp/Current/Workstation/WebHelp/Lang_1033/Co ntent/environment_all_settings.htm>, 6 pages.

MicroStrategy.com [online], "Memory Mapped Files for Intelligent Cubes," upon information and belief, available no later than Feb. 1, 2021, retrieved on Aug. 30, 2022, retrieved from URL <https://www2.microstrategy.com/producthelp/Current/SystemAdmin/WebHelp/Lang_1033/Content/memory_mapped_files_intelligent_cubes.htm>, 4 pages.

MicroStrategy.com [online], "MicroStrategy 2021 Readme," upon information and belief, available no later than Dec. 2020, retrieved on Aug. 30, 2022, retrieved from URL <https://www2.microstrategy.com/producthelp/Current/manuals/en/Readme.pdf>, 209 pages.

MicroStrategy.com [online], "Recommended System Settings for Linux," upon information and belief, available no later than Sep. 5, 2019, retrieved on Aug. 30, 2022, retrieved from URL <https://www2.microstrategy.com/producthelp/Current/InstallConfig/en-us/Content/Recommended_system_settings_for_UNIX_and_Linux.htm>, 3 pages.

MicroStrategy.com [online], "What's New in MicroStrategy 2021," upon information and belief, available no later than Dec. 2020, retrieved on Aug. 30, 2022, retrieved from URL <https://www2.microstrategy.com/producthelp/Current/Readme/en-us/content/whats_new.htm>, 76 pages.

Quasar.ai [online], "Memory-Mapped Files Considered Harmful (for Databases)," Jan. 24, 2022, retrieved on Aug. 30, 2022, retrieved from URL <https://quasar.ai/memory-mapped-files-considered-harmful/>, 6 pages.

red-gate.com [online], "Sharing is Caring: Using Memory Mapped Files in .NET," Apr. 17, 2018, retrieved on Aug. 30, 2022, retrieved from URL <https://www.red-gate.com/simple-talk/development/dotnet-development/sharing-caring-using-memory-mapped-files-net/>, 15 pages.

stackoverflow.com [online], "Is there an analysis speed or memory usage advantage to using HDF5 for large array storage (instead of flat binary files)?" Dec. 30, 2014, retrieved on Aug. 30, 2022, retrieved from URL <https://stackoverflow.com/questions/27710245/is-there-an-analysis-speed-or-memory-usage-advantage-to-using-hdf5-for-large-arr>, 9 pages.

Unix.StackExchange.com [online], "How does memory mapping a file have significant performance increases over the standard I/O system calls?" Oct. 11, 2018, retrieved on Aug. 30, 2022, retrieved from URL <https://unix.stackexchange.com/questions/474926/how-does-memory-mapping-a-file-have-significant-performance-increases-over-the-s>, 4 pages.

w3.cs.jmu.edu [online], "Shared Memory With Memory-mapped Files," upon information and belief, available no later than Jun. 1, 2021, retrieved on Aug. 30, 2022, retrieved from URL <https://w3.cs.jmu.edu/kirkpams/OpenCSF/Books/csf/html/MMap.html>, 3 pages.

Wikipedia.org [online], "Memory-mapped file," upon information and belief, available no later than Dec. 3, 2006, retrieved on Aug. 30, 2022, retrieved from URL <https://en.wikipedia.org/wiki/Memory-mapped_file>, 6 pages.

* cited by examiner

| Year | Country ID | Country Description | Month ID | Month Description | Revenue | Cost | Revenue{year} |
|---|---|---|---|---|---|---|---|
| | | Attribute Information | | | | Metric Information | |
| 1997 | 1 | United States | 199701 | January, 1997 | 123.0 | 150.0 | 100000.00 |
| 1997 | 1 | United States | 199702 | February, 1997 | 111.0 | 151.0 | 100000.00 |
| 1997 | 2 | United Kingdom | 199701 | January, 1997 | NULL | 152.0 | 100000.00 |
| 1997 | 2 | United Kingdom | 199702 | February, 1997 | 130.0 | NULL | 100000.00 |
| 1998 | 1 | United States | 199801 | January, 1998 | 135.0 | 200.0 | 200000.00 |
| 1998 | 1 | United States | 199802 | February, 1998 | 140.0 | 201.1 | 200000.00 |
| 1998 | 2 | United Kingdom | 199801 | January, 1998 | 159.0 | NULL | 200000.00 |
| 1998 | 2 | United Kingdom | 199802 | February, 1998 | 160.0 | 202.4 | 200000.00 |

MEMORY MAPPING TO ENHANCE DATA CUBE PERFORMANCE

BACKGROUND

The present specification relates to memory mapping techniques for enhancing data cube performance.

In modern enterprise computing systems, very large amounts of data are often stored in databases, data warehouses, and other data structures. Access to data from large data sets can result in high latency and low throughput for access, resulting in delays that users experience when obtaining query results or generating documents.

Some systems generate data cubes, which often provide multi-dimensional arrays of data in a format configured to improve the speed of data retrieval. The data cubes can be stored in system memory (e.g., random access memory (RAM)) to further increase the speed of data access. In order to obtain the latency and throughput benefits that result from in-memory hosting of data cubes, many server systems require extreme amounts of memory or must allocate large proportions of system memory to data cube storage. However, even optimized data cubes can be very large in many enterprise settings, even larger than the size of system memory.

SUMMARY

In some implementations, a computer system provides memory-mapped storage for data cubes, which can provide improved throughput and fast, consistent response times for data access. For example, a server system can use a data cube cache to selectively store portions of a very large data cube in memory (e.g., low-latency, high-bandwidth memory such as random access memory (RAM)). This can enable the system to provide access to very large data cubes with performance characteristics similar to those of full in-memory storage, but use only a fraction of the data cube size to do so.

As an example, a data cube can be divided into different segments and each of the segments can be stored and arranged to be accessed as a memory-mapped file (MMF). The results various MMFs that make up the data cube. The MMFs containing most frequently accessed portions of the data cube can have their content stored in the in-memory data cube cache for low-latency, high-throughput access, while the remainder of the data cube remains available through the MMF stored in non-volatile storage (e.g., hard disks, solid state disks (SSD), etc.) that provide higher capacity but lower performance. As a result, the entire data cube remains available for access and the most common portions are accessed with the performance of in-memory storage, but this is achieved with much less system memory overhead. This allows the system to provide a data cube for high-performance access even though the size of the data cube may exceed the than the amount of total system memory. Similarly, by maintaining only the cached portions of data cubes in memory, the system can concurrently maintain many large data cubes loaded and available for high-performance access, even though the combined size of the data cubes may be many times the total amount of system memory.

The contents of the data cube cache can be dynamically adjusted so that the cache includes the portions of the data cube that are accessed most frequently and/or most recently. This can be done by storing a subset of the MMFs of the data cube in the cache, with the subset being selected based on the amount of access that occurred over a recent period (e.g., the last hour, day, week, etc.). In some implementations, a software module monitors the usage of different MMFs and adjusts the contents of the cache accordingly over time. In some implementations, an operating system manages the cache, for example, using a virtual memory manager. The contents of the cache can be adjusted at the granularity of individual MMFs or at the level of portions or segments of individual MMFs (e.g., pages or other sections).

As discussed further below, the memory mapping and caching of data cubes can be enhanced using buffers that are managed by the system to reduce the number of data allocations needed during operations such as generating and publishing a data cube. Publishing a data cube often requires a large amount of memory, often several times more than the size of the resulting data cube, which itself may be nearly as large or even larger than the system memory of a server. In addition, the process of generating the data cube includes a number of memory allocations that can reduce performance for publishing a memory-mapped data cube.

The traditional approach for publishing data cubes makes a new memory allocation for each object in the data cube. Although this is sometimes acceptable in a fully in-memory technique, it creates very high delay and high processing overhead when publishing to a disk-based, memory-mapped data cube, where each object would result in a new memory mapped file. Further, because most operating systems align memory mapped files to page boundaries, creating small memory mapped files for data objects would result in wasted space. For example, with 4 kilobyte (KB) pages, a 1 KB object would take 4 KB of space, an 9 KB object would take 12 KB of space, etc. The creation of excessive amounts of memory mapped files thus creates excessive storage overhead as well as delays due to disk accesses and memory allocations.

To more efficiently use storage space and reduce memory allocations, the server system can generate and publish memory mapped data cubes using managed, disk-based buffers to reduce the number of MMFs needed and reduce the storage overhead and processing requirements. Each time a new memory allocation is needed, the system can determine whether the allocation involves an MMF. If so, the system can allocate a buffer that is larger than the needed size, for example, a predetermined default buffer size that is typically several times larger than the initial allocation request. Then, data objects of the data cube that are logically related in the data set are grouped together and written into the existing buffers, in the extra space provided in the original allocation. Operations that would normally allocate new memory for a data object are instead routed to the appropriate buffer if one exists. This reduces both the number new memory allocations that need to be performed and the number of total MMFs that are created and managed in the process. Once the buffer is filled, if the system identifies an additional write that would be directed to the buffer, the system causes the buffer to be re-allocated with a greater disk-based storage, adding enough extra space to handle various additional future writes.

Grouping the data objects in buffers according to their relationships in data set (and thus the relationships in the resulting data cube) also facilitates high performance of the data cube that is generated. Each buffer of related data can become one MMF in the final data cube, and related data is often accessed together. Buffering in this way localizes related data in the respective MMFs, which provides a performance advantage when those MMFs are cached. MMFs can each include data for a certain attribute, data column, or other portion of the data set. When caching is done selectively, MMF by MMF, operations for searching, filtering, and so on can be performed more effectively because the related data for a column, attribute, etc. is encompassed in the MMF for the portion of the data set.

In some implementations, a method performed by one or more computers includes: accessing a data set comprising data to be processed into a data cube; generating a memory-mapped data cube based on the data set, the memory-mapped data cube comprising a plurality of files including different segments of the data cube, wherein generating the memory-mapped data cube comprises: allocating memory-mapped buffers in non-volatile data storage in response to first memory allocation requests, wherein the memory-mapped buffers each allocate extra capacity such that the buffer exceeds an allocation size indicated in the corresponding first memory allocation request; after allocating the memory-mapped buffers and writing first components of the data cube in the memory-mapped buffers, responding to second memory allocation requests by providing addresses for locations in the extra capacity of the buffers; based on the provided addresses, writing second components of the data cube to the memory-mapped buffers; and storing contents of the respective buffers as files of the data cube; and loading the memory-mapped data cube by storing the files of the data cube in disk-based storage, mapping the stored files of the data cube to virtual memory addresses, and caching portions of the data cube in random-access memory.

In some implementations, the data cube is an online analytical processing (OLAP) data cube or a multi-table data import (MTDI) data cube.

In some implementations, the method includes adjusting the portions of the data cube that cached based on accesses to the data cube over a period of time.

In some implementations, the caching portions of the data cube in random-access memory comprises caching sub-file portions of the files of the data cube.

In some implementations, the caching portions of the data cube in random-access memory comprises performing page-level caching of the files of the data cube.

In some implementations, the caching portions of the data cube in random-access memory comprises selectively caching individual files of the data cube based on an access history for the files in the data cube.

In some implementations, the initial sizes of the memory-mapped buffers are more than double the allocation sizes requested in the first memory allocations.

In some implementations, the determining that, for a particular request of the second memory allocation requests, a requested allocation size exceeds an amount of available capacity in a memory-mapped buffer identified for handling memory allocation for the particular request; expanding the identified memory-mapped buffer by a predetermined increment that exceeds the requested allocation size; and after expanding the identified memory-mapped buffer, providing an address in the expanded buffer in response to the particular request.

Other embodiments of these and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 4B-4D are diagrams showing examples of data and components of data cubes.

Like reference numbers and designations in the various drawings indicate like elements.

DETAILED DESCRIPTION

Figure 1:
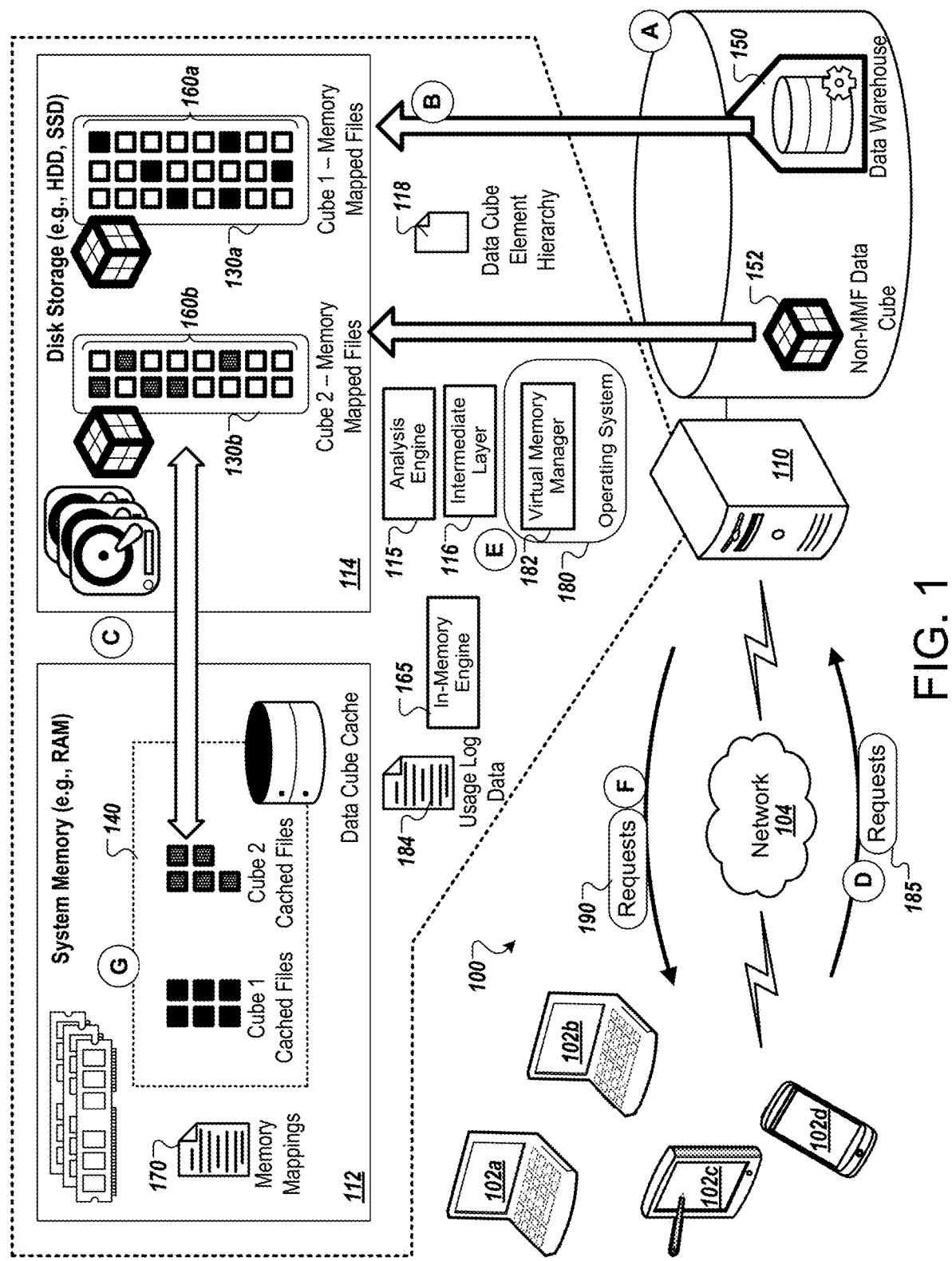
FIG. 1 is a diagram showing an example of a system for memory mapping for data cubes.

FIG. 1 is a diagram showing an example of a system 100 for memory mapping for data cubes. The system 100 includes a server system 110 that can generate and publish data cubes to memory-mapped storage in an efficient manner. The server system 110 can also load the memory-mapped data cubes and cache portions of the memory-mapped data cubes in-memory to provide very high performance data access while using an amount of memory that is only a fraction of the size of the data cube.

In some data analysis systems, to provide high performance, data cubes are loaded in system memory (e.g., fast, volatile memory such as DRAM) rather than slower types of storage such as non-volatile storage such as magnetic hard disk drives (HDDs) and solid state drives (SSDs). The data cubes are often loaded into memory in their entirety. This makes the data cubes ready for low-latency, high-throughput retrieval of information for generating responses to queries and other requests. In many cases, commonly-used data cubes are maintained in memory for significant periods, such as a week, a month, or even indefinitely.

In many typical loading scenarios, only a fraction of the total content in the data cube is accessed frequently. For example, it is common that a very high percentage of analysis run using a data cube, even 90%, run on a thin slice of data, e.g., data for the current month or last seven days. Despite data accesses targeting only a small portion of the cube, some systems are configured so that the entire data cube must be loaded into physical system memory (e.g., RAM) to provide high performance. This makes full in-memory loading of very large data cubes impossible when an individual data cube or a collection of data cubes exceeds the size of system memory.

The memory-mapping techniques discussed below enable the server system 110 to publish and run a data cube that is close to or even bigger than the physical memory size of the server system 110. The techniques also enable the server system 110 to publish and run multiple data cubes concurrently, where the cumulative size of the data cubes is close to or even larger than the physical memory size of the server system 110. In this process, the server system 110 can cache portions of the memory-mapped data cubes and actively adjust the contents of the cache over time based on the access patterns for the data cube. The technique improves efficiency of physical memory usage by keeping the most frequently used portions of a data cube cache active, while unloading the inactive portions to disk.

In addition, when generating or publishing data cubes, the data is written to MMFs so the process of publishing a data cube is not bottlenecked by available memory (e.g., RAM) in the server system 110. The server system 110 can allocate disk-based MMF buffers and accumulate related portions of the data in those buffers, increasing the sizes of the buffers to encompass larger amounts of disk storage as needed. Using the buffers to accumulate related portions of the data cube as it is created reduces the number of different memory allocations that need to be made and reduces the total number of MMFs needed for the data cube. Generating MMFs from the buffers in this way also localizes related data objects within the MMFs, which facilitates higher performance access once the generated data cube is used.

Many data analysis systems use data cubes, such as online analytical processing (OLAP) data cubes. The data cubes contain a multi-dimensional dataset, which is sometimes referred to as a hypercube if the number of dimensions is greater than 3. Other types of data cubes include multi-table data import (MTDI) cubes. Unlike some OLAP cubes, MTDI cubes often do not need a project schema defined, and so business users (rather than data architects) can more easily create these cubes by directly loading data from one or more sources. The user can specify which columns represent attributes, specify relationships among the attributes, and specify which columns represent metrics.

Data sets often include a number of data objects represented in the data, such as attributes and metrics. Each of these data objects may represent a column of data (e.g., such as a column in a table of the data set), a group of records, a set of values of a certain type taken from multiple records, or another portion of the data set. In general, an attribute often represents an entity or concept, such as product, employee, month, and so on. Attributes provide a context for metrics and provide ways that the data can be aggregated and organized. For example, a date attribute and location attribute can be defined in a data set, and values for dates and locations of different records are stored in the data set. This enables charts, graphs, tables, reports, query results, and other outputs to have data grouped or organized by date, by location, or both. A metric is a measure or key performance indicator, such as item count, revenue, profit, employee headcount, etc. In many cases, metrics are the types of calculations that are performed on data in the data set. For example, a revenue metric defined for the data set can represent that the calculation of revenue values by the data analysis system, derived from the underlying data set. The metrics can be calculated for aggregations of data defined by one or more attributes (e.g., revenue by location, revenue by date range, revenue by product, etc.). In some cases, the metrics may represent explicit sets of data values stored in the data set. As an alternative, the metrics may represent quantities derived from the data set, such as results of functions applied to data in the data set.

The techniques can provide other benefits including allowing high performance with lower amounts of physical resources, resulting in cost savings without compromising performance compared to full in-memory implementations. The techniques provide effective utilization of physical memory and allow servers to be self-healing while simplifying governance.

The example of FIG. 1 shows the server system 110 performing various operations for memory-mapped data cubes 130a-130b, including creating the memory-mapped data cubes 130a-130b, publishing or loading the memory-mapped data cubes 130a-130b into a combination of system memory 112 and disk-based storage 114, responding to requests using the memory-mapped data cubes 130a-130b, and adjusting the contents of a data cube cache 140 to improve performance for future accesses.

In stage (A), the server system 110 accesses a database 120 to obtain data to use to create memory-mapped data cubes 130a-130b. The database 120 stores data sets that provide the source data to generate the memory-mapped data cubes 130a-130b. For example, the source data for the data cube 130a is a data warehouse 150, and the server system 110 can generate the data cube 130a from the data warehouse 150 directly in a memory-mapped file arrangement. When creating a new data cube, a user can specify attributes, metrics, filters, and other data elements from a data set that are desired to be included in the new data cube. As another example, the source data for the data cube 130b is an existing data cube 152 in a traditional, non-memory-mapped format. The server system 110 can convert the existing data cube 152 into a memory-mapped version, e.g., data cube 130b.

In stage (B), the server system 110 creates and publishes the memory-mapped data cubes 130a-130b. This can include using the data from the data warehouse 150, non-memory-mapped data cube 152, or other data source to examine the relationships present among the data and extract the key data objects needed in the data cubes 130a-130b.

Traditionally, the process of publishing a data cube very large numbers of read and write operations, including very large amounts of working memory. For example, it is common that the peak amount of memory used during publication of a data cube can be several times the size of the resulting data cube itself. For publishing large data cubes, the amount of system memory 112 can be a very limiting factor. To avoid this bottleneck and to enable efficient generation of larger data cubes, the server system 110 uses memory-mapped file (MMF) buffers to store written data and accumulate data of the data cube as it is generated. In addition, the server system 110 reduces the number of memory allocation operations that need to be performed (and also the number of memory-to-disk mappings that need to be maintained) by accumulating data from different data objects in the on-disk buffers.

The data that makes up a data cube includes may different types of elements, such as columns of data, relationships among columns of data, index pools, element blocks, and more. These elements are discussed further with respect to FIGS. 3 and 4. When generating the memory-mapped data cubes 130a-130b, the server system 110 saves the data for various classes of data objects in the on-disk buffers, and then memory maps the files to memory addresses to provide the data objects for the classes. As noted above, the amount of data being manipulated would require too many memory allocations to store cube data in system memory 112. Further, the performance cost and storage cost would be prohibitive to made a separate MMF for every memory allocation or data object written. To address this, the server system 110 implements the on-disk, memory-mapped buffers and associated logic to provide an intermediate layer 116 to handle the large volume of memory allocations and data object writes that occur.

The buffer implementation can differentiate on-disk buffers from in-memory buffers (e.g., stored on the heap in memory). The system 110 passes a value, e.g., a flag or parameter, to specify when an on-disk buffer should be created. This value can be set for a buffer so that on-disk buffers and in-memory buffers are handled differently. When using or creating an on-disk buffer, the software can be passed a file name and/or location corresponding for the buffer.

The server system 110 can implement two versions of the on-disk buffer: (1) a lock-free buffer which is safe for use with multi-threaded processing, and (2) a simple buffer that is designed for single threaded processing. Both of these buffers can be derived from the same base software class, which can provide a callable software function to reserve a segment of on-disk memory. Both versions of the buffer can request chunks of memory from the operating system, and can manage those memory chunks inside the buffer implementation for object/data memory allocations.

The buffer implementation used the analysis engine 115 (e.g., software or application(s)) that generate the data cube data with minimal changes from an in-memory approach. For example, the analysis engine 115 that looks up data from the data warehouse 150 or data cube 152 can make memory allocation requests for storage of data cube components, and an intermediate layer 116 can handle those requests with buffer allocation and usage. The intermediate layer 116 can group data writes for related portions of the data cube, so that these writes and associated allocations all use the same buffer. The buffer can be re-sized as needed to continue to aggregate related data.

For example, a buffer can be allocated corresponding to a particular column of data. When the initial memory allocation is made, the request may be to store data for an element of 1 KB. Where a typical memory allocation would be handled by allocating the requested 1 KB, the server system 110 instead creates a new on-disk buffer that has significantly more than the requested amount, e.g., 10 KB. The initial buffer size can be a default value, for example, one that is several times larger than the typical allocation request size. The server system 110 returns a memory-mapped address for the requested 1 KB of storage, referring to a portion of the new on-disk buffer, so that the write associated with the particular column of data can proceed. When an additional memory allocation request is issued for storing data of this particular column, e.g., a second memory allocation request for another 1 KB of memory, the server system 110 returns a reference to another portion of the existing on-disk buffer. The space for the second and subsequent allocations is already available due to the over-sized initial allocation of the on-disk, memory mapped buffer. As writing of a data cube continues, memory allocations and writes for the same related portion of the data cube are directed to the same buffer, which continues to accumulate written data until a memory allocation request is received that requires more than the available space left in the buffer. This triggers the server system 110 to re-allocate the buffer with an more capacity, leaving additional unused storage space as in the initial allocation. For example, if the buffer with 10 KB capacity has 9 KB of data written to it, and a memory allocation request for 2 KB is received, the server system 110 can expand the size of the buffer by 10 KB, resulting in a buffer of 20 KB capacity. After the 2 KB write is completed, there is still additional space for several additional writes before the buffer's space is filled.

In some storage systems, allocations are aligned with certain data elements such as blocks or pages. For example, a file system may have a minimum file size of one page, which may be 4 kB (or another size), resulting in a 4 kB allocation resulting for a 1 kB allocation request or file write. In the case of the buffer sizes, the extra capacity allocated can be several multiples of the minimum unit size that can be allocated. For example, if 4 kB pages are used, the initial buffer size can be 4 pages (e.g., 16 kB), or 10 pages (e.g., 40 kB) or other multiple of the page size. As a result, the extra capacity allocated in the buffers is typically significantly more than simply rounding up to or aligning to the next page boundary. Thus, the amount of extra capacity in the initial buffer size, as well as the amount of extra capacity in an expanded buffer, can be one or more units (e.g., pages, blocks, etc.) in addition to whatever size adjustment aligns a requested amount of memory to a unit boundary.

The server system 110 can have many different on-disk, memory-mapped buffers active and accumulating data concurrently, with each buffer aggregating a different related group or portion of the data cube. For example, different buffers may correspond to different columns of data, different rows of data, different tables, different indexes, different types of keys, different relationships (e.g., data for pairs or groups of attributes or metrics), and so on. In this manner, the related data (e.g., values of a certain type or for a certain attribute or metric) can be grouped together in a single buffer, which, when writing of the data cube is complete, will become one of the various MMFs of one of the memory-mapped data cubes 130a-130b. This can be done for each column, each index, each relationship table, and for other elements of the data cube. The process of identifying, organizing, and writing related data objects (e.g., values for a column) may involve various different memory allocations and writes, interspersed with operations for other portions of the data cube. Rather than allocating memory for each of the data objects until the data cube is complete (which would require a very large amount of memory) or creating a memory mapped file for each allocation (which would create excessive storage overhead and mapping operations), the number of memory mapped files is limited. The number of memory allocations is greatly reduced, to only a fraction of the memory allocation requests, because the majority of the allocation requests can be handled using existing space in already-allocated memory-mapped buffers.

To enable the server system 110 to group related objects into the appropriate buffers, the server system 110 can generate, store, and use an element hierarchy 118 for the resulting data cube. The element hierarchy 118 can specify the types or classes of elements to be included (e.g., column, relationship table, index, element block, etc.), as well as instances of these (e.g., location attribute column, date attribute column, date/location relationship table, product/location relationship table, etc.). The element hierarchy 118 can thus indicate the schema or collection of logical structures and relationships among the data, from which the server system 110 can determine the number of MMFs to create and the relationships among them. As discussed further below, the data cube is organized to divide the data cube content into logically or semantically related components or files. This provides various efficiencies including the ability to efficiently write the data cube using various buffers, with each buffer accumulating related data. The structure also facilitates future updates to the data cube after it is generated, by allowing only a few of the components or files to be updated while leaving the remainder unchanged. The element hierarchy 118 can be determined for each memory-mapped data cube 130a-130b to be generated. For example, a standard set of data object types can be used for all data cubes. Each different data cube to be generated has its own set of attributes, metrics, filters, indexes, and so on. Applying the data-cube-specific elements to the standard object types or classes can result in a data structure, such as the element hierarchy 118, that specifies the elements of a data cube to be generated and thus buffers (and consequently MMFs) to be generated for that data cube.

The server system 110 can use the results of analyzing the data warehouse 150 or data cube 152 (e.g., the element hierarchy 118 that is produced), to enumerate the different components (e.g., files or objects) to be included in the data cube to be generated. The server system 110 can generate a list of the different components to be included in the data cube and can allocate a buffer for each component. For example, before generating the data cube content, the analysis can create an element hierarchy 118 as a graph or tree, with data cube components as nodes (e.g., leaf nodes) in the graph or tree. As another example, the server system 110 can simply identify, for each of multiple component types (e.g., column, relationship table, index, etc.), the instances of that component type to be included in the data cube being generated. For example, the server system 110 can determine that there are 20 columns to be represented as different components (e.g., separate files) in the data cube, and determine the attributes or metrics for each component, e.g., date, city, country, product quantity, product identifier, etc. The server system 110 similarly identifies each of the indexes, tables, and other components to be included in the data cube.

The server system 110 allocates a buffer for each of the components enumerated. As an example, the system 110 may determine that the data cube should have 500 components (e.g., 20 column components, 20 lookup table components, 300 relationship table components, 50 index components, and 110 fact table or element slice components) and can identify what each of the 500 components will be. The server system 110 then allocates a different buffer for each of the different components (e.g., 500 buffers for 500 components). The server system 110 associates each component or element with its corresponding buffer by storing a pointer to the buffer. As a result, when data is to be written to a component (e.g., any particular component, such as lookup table for a "country" attribute), the server system 110 has the pointer to the buffer for that component and the server system 110 uses the pointer to write data to the corresponding buffer.

The buffers can be initially allocated with a default size, and then the buffers can each be expanded as needed as data for the components is added. As discussed further below, the intermediate layer 116 can be used to manage the buffers and to automatically re-size (e.g., expand) them. In some cases, to carry out writes the analysis engine 115 sends memory allocation requests to the intermediate layer 116. In response to an allocation request for a data cube component, the intermediate layer 116 determines whether there is sufficient remaining space in the buffer for the component, expands the buffer if needed to fulfill the memory allocation request, and responds to the request by providing an address specifying an area within the buffer for the component where the desired amount of data can be written. For example, the memory allocation request can identify a data cube component identifier or buffer identifier for a component's buffer, as well as an amount of memory to be allocated (e.g., 10 kB). The intermediate layer 116 can use the provided data cube component identifier or buffer identifier to identify the appropriate buffer, check whether the amount of storage available in the buffer provides the requested amount of space, expand the buffer if needed, and return a pointer or a logical address for a portion of the buffer where data should be written.

In short, the analysis engine 115, which processes the source data and has information defining the desired parameters of the data cube to be generated (e.g., the attributes, metrics, filters, etc. to be included), can associate memory allocation requests or writes with data cube components, and the intermediate layer 116 manages a memory-mapped buffer for each data cube component. The intermediate layer 116 groups allocations and writes into the respective buffers according to the data cube components that the buffers respectively correspond to. In this process, the intermediate layer 116 does not require information about the data cube logical structure or the element hierarchy 118 for the data cube. The intermediate layer 116 only tracks the status and available space for the buffers, maintaining a buffer for each data cube component and performing allocations and writes to the buffers matching the data cube component or buffer specified in the allocation or write requests.

When multiple memory-mapped data cubes 130a-130b are being generated, the allocation requests or write requests can also be associated with a cube identifier for the data cube being generated (e.g., cube identifier 1 for cube 130a, cube identifier 2 for cube 130b, etc.) to match requests with the correct set of cube components. As another option, each component or buffer can have a unique identifier across all of the cubes being generated to avoid conflicts. As another option, different processes, threads, or software instances can be tasked with creating different data cubes 130a-130b. The intermediate layer 116 can associate the set of buffers for a particular data cube being generated with the identifiers for the particular software processes, threads, instances, etc. that are creating that data cube (e.g., threads 1-5 corresponding to cube 130a, threads 6-10 corresponding to cube 130b, etc.).

The use of memory-mapped, on-disk buffers reduces system memory overhead and usage, since the on-disk buffers provide non-volatile storage and can be selectively accessed. Even if contents of some of the buffers are also temporarily stored in system memory 112 (e.g., with a copy cached or used during an operation), changed data for any or all of the buffers can simply be written back to the on-disk buffers and the data removed from memory 112, making new space in memory 112 to process a different portion of the data cube.

As a related technique, in some implementations the server system 110 uses a streaming mode or pipelined mode in connection with the buffer usage for further increases in performance and decreases in memory overhead. For example, the server system 110 can fetch and process data chunk by chunk from the data source, with a chunk size such as 100 megabytes (MB) to 500 MB. Once one chunk of data is ready, the analysis engine 115 processes it right way in-memory, without waiting for all the related source data to be retrieved and processed. The server system stores the output resulting from processing the chunk in one or more buffers that are memory mapped. In this way, the server system 110 uses less memory because it does not need to accumulate all the raw data in memory 112, and the server system 110 can also parallelize the entire cube publishing process (e.g., both in-memory analysis processing and data fetching chunk by chunk in pipelined mode) to achieve better performance. As discussed above, the buffer implementation can be made with access locks to allow multi-threading, so that multiple analysis engine 115 agents or instances can concurrently be processing different chunks of the source data and distributing writes among the same set of allocated memory-mapped buffers.

Once all of the source data for a memory-mapped data cube 130a-130b is processed, and the output of the generated memory-mapped data cube 130a-130b is complete and written to the buffers, the contents of the different on-disk buffers are saved as different files (e.g., with each buffer stored as a separate file). In some implementations, each buffer represents a different file to be stored in the final memory-mapped data cube 130a-130b, with each of the files configured to be memory mapped when the mapped data cube 130a-130b is loaded. In the example of FIG. 1, the generated data cube 130a shows 24 different boxes, each representing a different file 160a. Each of these files 160a stores the contents of one of the 24 buffers used to accumulate different data objects written during generation of the data cube 130a. For the data cube 130b, fewer elements were used (e.g., fewer attributes, metrics, filters, etc. defined in the logical structure of the data cube 130b), and so only 16 files 160b are stored, each representing the contents of one of 16 buffers allocated and used during generation of the data cube 130b.

In stage (C), the server system 110 loads the memory-mapped data cubes 130a-130b, making them active and available for use in data processing operations. When loaded, each data cube 130a-130b is fully stored in disk-based storage 114, and memory mappings 170 are made to assign and store virtual memory addresses for the various sets of files 160a, 160b that comprise the respective data cubes 130a-130b. The server system 110 also prepares a data cube cache 140 to store selected portions of the data cubes 130a-130b (e.g., contents of selected files 160a, 160b) for fast access.

All the data cube data is saved into files 160a, 160b on disk 114. Instead of loading all the cube data into memory 112, only frequently-used data are loaded into memory 112, while the rest of the data stays on disk. If some part of the data cube is needed and not available in memory 112 yet, the corresponding files 160a, 160b on disk 114 will be read into memory 112. If there is not sufficient available memory 112 to accommodate the new files, data swapping will occur, with some existing data in memory 112 being swapped out of the cache 140 and the needed data being swapped into the memory 112 from disk 114.

Loading the data cubes 130a-130b includes storing the sets of files 160a, 160b for the different data cubes 130a-130b in appropriate non-volatile storage (e.g., disk-based storage, such as hard disk drives (HDDs), solid state drives (SSDs), etc.). In some implementations, this may include migrating the stored sets of files 160a, 160b from one data storage system to another or from one server system to another, especially if the server and file system used to generate the data cubes 130a-130b is different from the one that is loading the data cubes 130a-130b.

The server system 110 generates appropriate memory mappings 170 that assign virtual memory addresses to each of the various files 160a, 160b of the data cubes 130a-130b stored in the disk storage 114. As a result, each of the files 160a, 160b is arranged for access as a memory-mapped file (MMF). The server system 110 can use memory mapping features of its operating system 180 (e.g., Linux, Microsoft Windows Server, MacOS Server, Solaris, etc.) to perform this memory mapping and to manage accesses to the MMFs.

For example, the operating system 180 include a virtual memory manager 182 that handles creating, maintaining, and using the memory mappings 170 to provide memory-mapped access to the sets of files 160a, 160b of the data cubes 130a-130b.

File mapping can include the association of a file's contents with a portion of the address space of a software process. Once a file is mapped, programs can use a memory pointer to read and write the content of the file, even though it is stored on disk 114. To efficiently use the operating system's memory mapped file capabilities, the major types of data cube elements (e.g., attribute lookup tables, metric slices, index keys, and element blocks) are stored in the files 160a, 160b, and the operating system 180 memory maps each of the files 160a, 160b to memory pointers. In fact, this allows integration with an in-memory engine 165 that is also configured to access fully in-memory data cubes. The in-memory engine 165 does not need to change its data structures and algorithms to use memory-mapped data cubes, and it can use the memory pointers for memory-mapped files in the same manner that it would use pointers for data stored in memory. The operating system 180 can manage the caching and swapping of data from disk 114 to memory 112 dynamically.

The server system 110 also selectively populates the data cube cache 140, stored in the system memory 112, with portions of the memory-mapped data cubes 130a-130b (e.g., contents of certain MMFs). Initially, the cache 140 may be populated as different files 160a, 160b are accessed. As a MMF is accessed, the contents of the MMF can be loaded into, and at least temporarily retained in, the in-memory data cube cache 140 for faster access in the future. The server system 110 can use the operating system's capability for memory mapping files to manage the contents of the data cube cache 140. By leveraging MMFs for data cubes, the operating system 180 can do much of the analysis and adjustment to keep "hot" data (e.g., data that is currently or recently accessed) in memory 112, while the portions of a data cube 130a-130b that are not being accessed will remain stored on disk 114, ready for rapid retrieval.

As the data cubes 130a-130a are used, the usage statistics for different files 160a, 160b or even portions or files (e.g., pages, groups of pages, etc.) are determined. These usage statistics are used to determine portions of the data cubes 130a-130b (e.g., which files 160a, 160b or portions of them) to retain in the data cube cache 140. For example, the portions of the data cubes 130a-130b most commonly used over a period of time (e.g., the previous hour, previous day, etc.) can be stored in the cache 140. This way, the portions most likely to be accessed will be available and ready in system memory 112 in the data cube cache 140, allowing for very low-latency and high throughput access. With a high cache hit rate, the performance can approximate that of full in-memory data cube storage with only a fraction of the memory usage.

In some implementations, the operating system 180 manages the contents of the cache 140 and the memory usage of the data cubes 130a-130b. The operating system 180 also performs data swapping using the MMFs to adjust the cache contents as needed. The operating system 180 can manage what, when, and how the data in the files 160a, 160b on disk 114 are read and swapped into memory 112, as well as what, when, and how the data in the cache 140 in memory 112 are swapped out if memory pressure (e.g., aggregate memory usage) reaches a threshold.

Allowing the operating system 180 to manage the cache 140 and memory mapped files can provide various advantages. There is no need for application software to manage buffers and the file data and the synchronization of them. The operating system 180 does this efficiently with a high degree of reliability. Data swapping can be performed on a page-by-page granularity. As a result, there is no need to swap entire files 160a, 160b in and out of memory. Startup of the server system 110 and loading of the data cubes 130a-130b can also be much faster with file mapping, because the system does not need to perform cube data de-serialization.

As another technique for managing the cache 140, the server system 110 can implement other software for managing the cache 140 and swapping data in and out, separate from the operating system 180. For example, an in-memory engine 165 can select which data will reside in the in-memory cache 140, which data will be swapped out onto disk 114, and which data will be read into memory 112 from disk 114 and when based on current cube memory usage and a memory quota set by a user or administrator. The in-memory engine 165 can manage cached elements such as index keys, row maps, metric slices, and look-up tables.

One of the advantages of the server system 110 managing contents of the cache 140 and total memory usage, separate from or instead of caching by the operating system 180, is that applications of the server system 110 can more easily monitor how much memory 112 is used by each data cube 130a-130b, and can also set and enforce limits for the amount of memory 112 that each data cube 130a-130b uses. Software of the server system 110 can control which portions of the data cubes 130a-130b should be kept in memory 112 and which data should be unloaded to disk 114. To facilitate effective use of the cache 140, the server system 110 can monitor access to the different files 160a, 160b or even sub-file portions of the data cubes 130a-130b and store a log 184 of the accesses. The information about access patterns, access statistics, and other usage information can be used to score and evaluate the likelihood of future accesses to different portions of the data cubes 130a-130b, so the server system 110 can select the different files 160a, 160b and/or portions of the files 160a, 160b to store in the cache 140 at any given time. A management application or service on the server system 110 can monitor usage on an ongoing basis, repeatedly adjusting the contents of the cache 140 to reflect usage patterns in a sliding window of a previous period of time (e.g., previous hour, previous day, etc.).

In addition to or instead of this operating-system-managed cache management, the server system 110 can enhance performance by proactively designating certain portions of a data cube to be cached. For example, the server system 110 can designate certain elements of a data cube, such as indexes, to be stored in the in-memory data cube cache due to the performance benefit they provide, even if they are not the most frequently or recently used elements. The server system 110 can also perform analysis of actual usage of data cube elements to designate certain portions to remain in the cache, based on a longer period of time than the operating system uses. For example, the operating system may use a caching scheme that brings in new data as it is accessed and evicts from the cache data that has been used least-recently. This may occur on a very short time scale, such as over seconds or less, and result in very high turnover in the cache. To moderate the cache turnover, the server system 110 can identify commonly used portions of the data set (e.g., looking at a larger time scale than the operating system's caching analysis, such as over hours, days, etc.) and designate the most commonly used portions to be maintained in the cache. The server system 110 can update the set of which portions (e.g., MMFs) to store in the cache over time, repeatedly adjusting the selection of portions or priority of portions as usage occurs. The server system 110 can provide this information about cache priority to the operating system to use in its caching, or in some implementations the server system 110 may designate portions to be cached separate from or independent from the operating-system-level caching (e.g., designating content to cache in addition to the operating-system-selected cache content).

In stage (D), the server system 110 receives requests 185 from client devices 102a-102d over a communication network 104. The request 185 can include queries, requests to retrieve data, document generation requests, requests to generate or adjust visualizations of data, requests to filter data, or other requests that make use of the data in the data cubes 130a-130b.

In stage (E), the server system 110 responds to the requests 185 by accessing the data cubes 130a-130b that are loaded as memory mapped files. For example, the in-memory engine 165, which is configured to perform operations using data cubes, can use the addresses specified by the memory mappings 170 for the locations of different portions of the data cubes 130a-130b. In some implementations, the operating system 180 manages the cache 140 and memory mappings 170 to files on disk, and so the in-memory engine 165 can simply refer to the addresses the operation system provides for data in the data cubes 130a-130b. Accesses to portions of the data cubes 130a-130b that are already in the cache 140 occur very quickly, and for data not currently in the cache 140 the in-memory engine 165 can still access the remaining data from disk 114 through the provided addresses. The operating system 180 can bring data from disk 114 into the cache 140 automatically in the background as it is accessed, swapping out cached data that has not been used recently.

Using the data in the memory-mapped data cubes 130a-130b, the in-memory engine 165 and applications of the server system 110 generate responses to the user requests 185. For example, from the data in one or more data cubes 130a-130b, the server system 110 can obtain a list of results to a query, generate a report or other document, filter a data set, generate a visualization of data, and obtain other outputs. In some cases, the server system 110 provides data to one or more other servers which may use the data from the data cubes 130a-130b to generate outputs for the client devices 102a-102d.

In stage (F), the server system 110 provides responses 190 to the requests 185 over the network 104 to the client devices 102a-102d. As discussed above, this can include data of documents, search results, visualizations, and more.

In stage (G), the server system 110 adjusts the contents of the cache 140 based on the usage history for the data cubes 130a-130b. The operating system 180 or other software of the server system 110 can bring data from disk 114 into the cache 140 as it is requested, for use in current data processing operations that are being performed. However, the current portions or most recent portions a data cube accessed are not always the most likely to be used in the future. To more effectively provide high-performance access for later requests, the operating system 180 or the analysis engine 115 can evaluate a greater variety of factors in determining which data to cache 140, including proactively populating the cache with portions of the data cubes 130a-130b that are predicted to be used in the future.

Managing the cache 140 can include predictively loading commonly-accessed portions of the data cubes 130a-130b into the cache 140, even if those portions are not the most recently accessed. The usage log 184 provides indications of the patterns of usage, including the sequences in which different data is accessed, the types of data accessed, and the combinations of data accessed together. The operating system 180 or the analysis engine 115 can use the usage history to prioritize or rank different portions of the data cubes 130a-130b and predictively load (e.g., pre-fetch) into the cache 140, or maintain in the cache 140, portions that have the highest priority based on factors such as most recent use, total number of uses over a recent time period, priority of previous accesses (e.g., where priority may vary based on the type of request, user associated with the request, device or system that originated the request, etc.), and so on. The server system 110 adjusts the cache 140 over time, based on the usage patterns observed, to dynamically adjust the contents to include the data predicted to be most likely to be accessed, even if those are not the most recently accessed.

Figure 2:
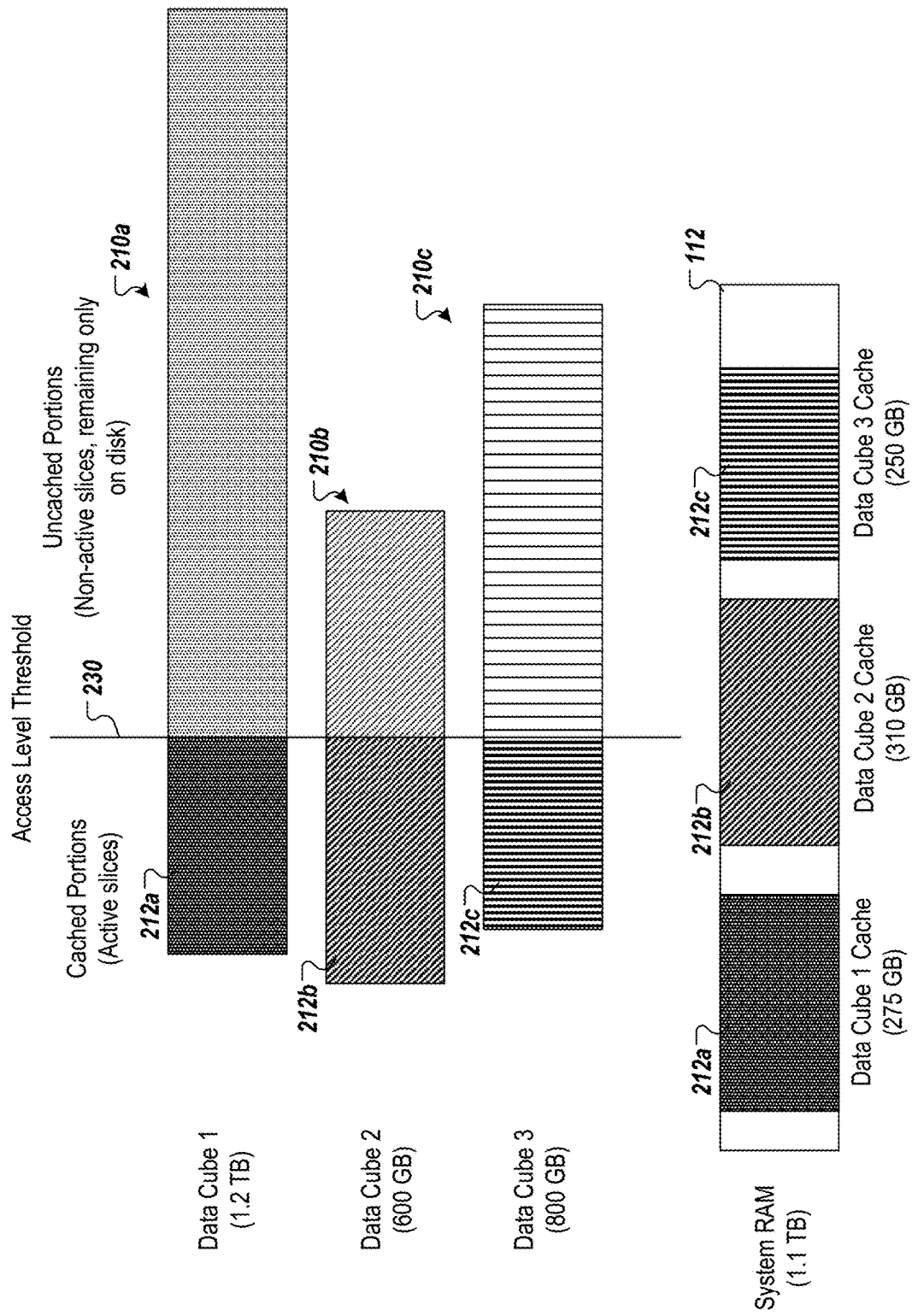
FIG. 2 is a diagram illustrating relationships between data cubes, system memory, and data cube caches.

FIG. 2 is a diagram illustrating relationships between data cubes, system memory, and data cube caches. The example shows how three large data cubes 210a-210c can be loaded and run concurrently in the server system 110, even though the combined size of the data cubes exceeds the size of the system memory 112. In the example, only one of the cubes 210b, 210c would fit in the system memory 112 at a time, and the data cube 210a is larger than the system memory and so would not fit in the system memory 112.

The three data cubes 210a-210c are each loaded as collections of MMFs. The entirety of each data cube 210a-210c can be stored in disk-based or non-volatile storage. A portion of each data cube 210a-210c is stored as a cached portion 212a-212c in the system memory 112. The cached portions 212a-212c allow high performance (e.g., low latency and high throughput) in-memory access for data that is cached. Because the cached data is the data that is most commonly accessed and is most likely to be accessed, the arrangement provides overall high performance even though only a portion of each data cube 210a-210c is stored in memory.

Each cached portion 212a-212c can be a subset of the MMFs that meet certain thresholds for access or usage (e.g., for frequency of access, recency of access, total amount of accesses, etc.). For each data cube 210a-210c, the server system 110 varies which portions of the data cube 210a-210c (e.g., which MMFs or portions thereof) are stored in the corresponding cached portion 212a-212c over time. In other words, the server system 110 can dynamically vary the amount and contents of the cache for each of the different data cubes 210a-210c based on the access and usage over a recent period of time, such as the previous hour, day, week, etc.

In managing the caches, the server system 110 can dynamically scale the amount of memory (e.g., size of cache) allocated for each data cube 210a-210c. A data cube 210a-210c that has a higher volume of access over a period of time can be allocated more memory for cache while the cache size for a data cube 210a-210c with lower volume of access can be reduced. As a result, the access level threshold 230 shown can be dynamically adjusted and optimized based on the load levels and access patterns that occur for the set of data cubes 210a-210c loaded. For example, for a system under high load, the server system 110 may cache data that has been accessed at least 15 times in the previous hour, where MMFs meeting this criteria fill the available system memory 112 that the server system 110 is configured to allocate to data cube caching. By contrast, under a scenario with much lighter load, the server system 110 may fill the caches with data that has been accessed at least 3 times in the previous hour.

The server system 110 may manage the caches by prioritizing portions of the data cubes 210a-210c by some combination of frequency of access, recency of access, total number of accesses, types of accesses, and more. The server system 110 can consider many different factors, including access statistics over different time periods, and weight the values for different factors to determine an overall priority for caching. For example, MMFs may be assigned a priority score that combines the number of accesses over the previous hour, day, and week in a weighted average that gives higher weight to the most recent uses but gives at least some weight to use in older uses. The weighted average may include or be adjusted by measures indicating the importance or priority of those accesses, e.g., values indicating the amounts or proportions of the accesses due to requests from high-priority users or devices. Similarly, the priority can be weighted according to the amounts or proportions of the accesses corresponding to different types of tasks, e.g., where using the data to generate a real-time alert, generate data for an active user interface, or respond to a user request may indicate higher priority than accesses to perform scheduled tasks, perform system-initiated tasks, or perform background report generation. As a result, the different MMFs of the data cubes 210a-210c can be assigned scores, and the server system 110 selects the MMFs with the scores indicating the highest priority to include in the cache.

In some implementations, the priorities or scores can be compared for each data cube individually, so that the access patterns for each individual data cube 210a-210c determine the contents of the cache for that data cube, with the cache being filled up to a predetermined size or a maximum proportion of the system memory 112 set for an individual data cube 210a-210c. This can be helpful to maintain a desired level of performance or quality of service for each data cube 210a-210c separately. For example, the server system 110 may evaluate the access patterns for each data cube 210a-210c individually and set a different threshold for the priority score or access statistics that would result in a MMF being cached (e.g., at least 5 accesses in the previous hour for cube 1, at least 8 accesses in the previous hour for cube 2, etc.).

In some implementations, it can be beneficial for the server system 110 to manage the caches for the multiple data cubes 210a-210c as a whole, comparing the priorities or scores across the set of multiple data cubes 210a-210c that are loaded. The threshold 230 for which data is cached and which is not is determined based on the aggregate data access patterns across the combined set of data cubes 210a-210c that the server system 110 hosts. This can grow the size of the cache of the most frequently or most heavily used data cube 210a-210c, while shrinking the amount of cache for the other data cubes 210a-210c. This technique can enable overall lower latency and higher throughput for the server system 110 as a whole, with data that is most frequently accessed is included in the cache regardless of which data cube 210a-210c it is from, although performance for less-used data cubes would likely be decreased.

Similarly, the server system 110 can adjust the total amount of system memory 112 allocated for data cube caching to allow appropriate memory for other server system functions. The server system 110 can reserve a desired amount of system memory 112 for other applications and server functions. The server system 210 can also maintain at least a minimum amount of memory unused and available for dynamically loading data (e.g., MMFs) from uncached portions of the data cubes 210a-210c to respond to requests to access data outside the cached portions 212a-212c.

Figure 3:
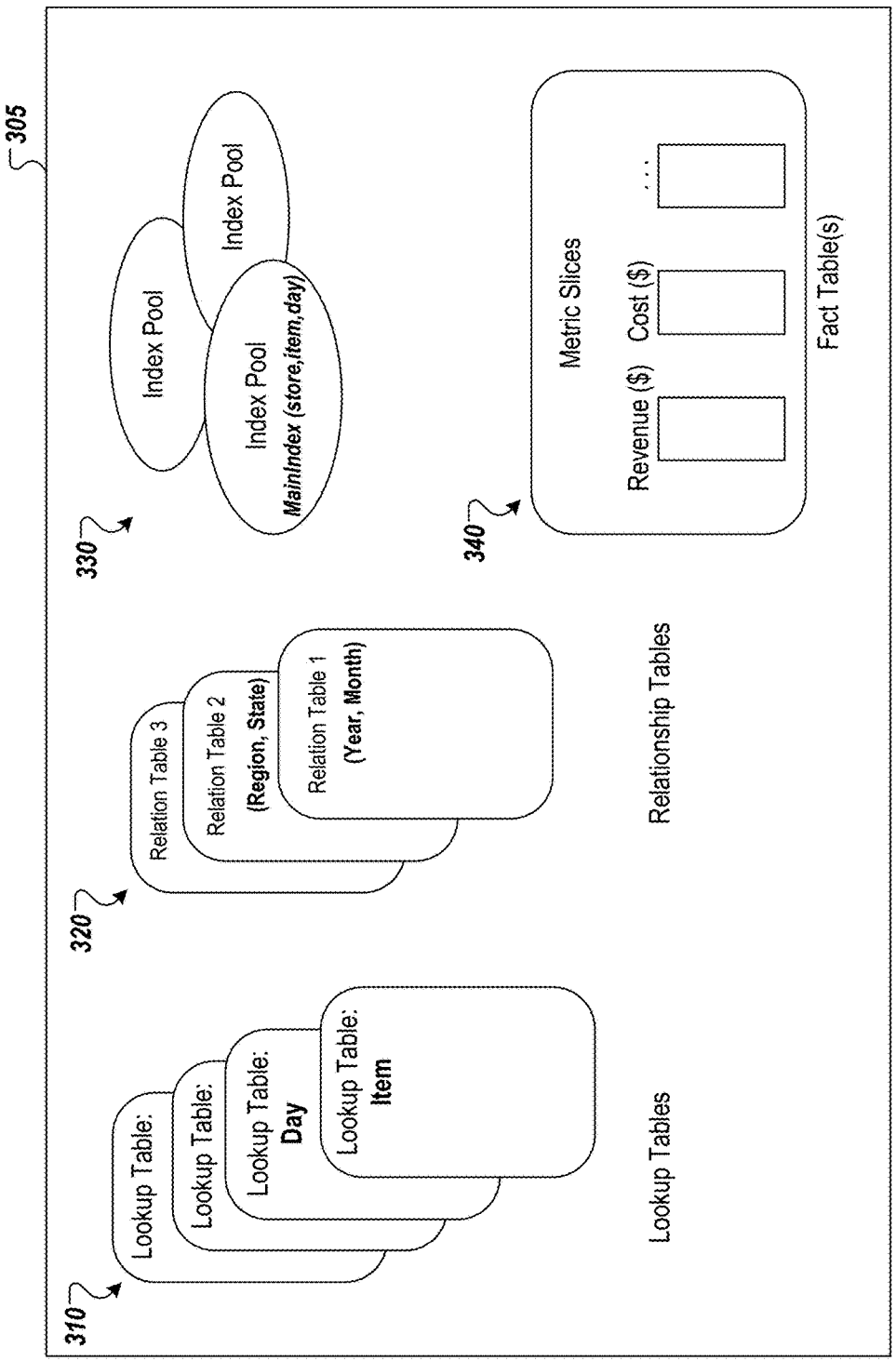
FIG. 3 is a diagram illustrating examples of types of data included in a data cube.

FIG. 3 is a diagram illustrating an example of types of data included in a data cube 305. The example shows items such as lookup tables 310, relationship tables 320, index pools 330, and one or more fact tables 340 (which can include or be made up of metric slices). The lookup tables 310 include information for different attributes, e.g., a lookup table for retrieving information by day, by item, etc. The relationship tables 320 indicate relationships between different combinations of attributes, such as different pairs of attributes (e.g., year and month, region and state, etc.). The index pools 330 represent indexes for different combinations of attributes, such as an index pool for a store, item, and day. The fact table(s) 340 include data for various attributes and metrics, such as revenue, cost, and so on. Metric slices can refer to the data for different metrics, with the data for each metric being stored as a different slice. When the data cube 305 is generated, the memory-mapped files or buffers can be set to correspond to components such as those shown in FIG. 3. For example, there can be different memory-mapped buffers set for each lookup table 310, for each relationship table 320, for each index pool 330, and for the fact table 340, as well as potentially for each components of other types. The buffers each respectively accumulate data for the corresponding data cube component during the process of generating of the data cube 305, and when complete each of data component is a separate file that can be memory mapped when the completed data cube 305 is used.

As an example, the source data for generating the data cube 305 may include tabular data, such as a large data table with various columns including values for different attributes and metrics. A very simple example may include data for five attributes (e.g., data in five columns respectively including values for data types such as year, month, day, store number, product identifier) and one metric (e.g., data for a column of sales amount values, such as total daily sales for a location for a product identifier). The server system 110 analyzes the contents of the source data to extract the referenced elements in the data and their relationships, and the analysis module 115 identifies the 5 attributes and the metric. From these and potentially other data set characteristics, the server system 110 determines the data cube components to generated. These components often include: a fact table 340 to include the values in the data set across the various attributes and metrics; separate lookup tables 310 for each attribute; separate relationship tables 320 for each of one or more pairs of attributes; and separate index pools 330 for various sets of indexes and related data. A separate memory-mapped buffer is allocated for each of the components, and as generation of the data cube 305 proceeds, data is added to and accumulated in the respective memory-mapped buffers to create the files that will form the data cube 305. The elements of the data cube are discussed further below.

In general, a single fact table 340 can be used to store the values of the records in the source data, e.g., the values for each of the attributes for various transactions, rows, or other records. The values can be stored in a compressed or optimized format, for example, using run-length encoding and other techniques. The fact table 340 can use a compact encoding that may replace certain data elements with more compact versions. For example, the values for a "product identifier" attributes may be long serial numbers or text strings, but can these can be replaced with simple identifiers that the server system 110 assigns. When a user initiates the generation of a data cube, the user may specify which tables to use and may indicate the number of fact tables 340 to be used. For example, in some implementations, each data table in the source data can be represented as a different fact table 340 in the generated data cube 305, and the data may be stored in a separate corresponding memory-mapped file.

The lookup tables 310 serve as a dictionary to specify the meaning of the encoded values in the fact table 340. The lookup table can be used to translate from the encoded value for an attribute to the actual value. For example, the lookup table for the "product identifier" attribute can specify that encoded value 1 represents product identifier "UPC2436632-221," encoded value 2 represents product identifier "UPC76522282-001," and so on. In some cases, the number of entries in a lookup table can be the number of unique values for the attribute in the data set. Because the values for each attribute may be encoded differently, a separate lookup table 310 (stored in its own memory-mapped buffer) can be generated for each attribute.

The relationship tables 320 each indicate the relationship present between two different attributes. In many cases, the relationship tables specify relationships among attributes that describe the same dimension but at different levels of granularity. For example, day, month, and year are all attributes related to the dimension of time. The system can generate a first relationship table for attributes day and month, indicating the days that are in a month, and generate a second relationship table for attributes month and year, indicating the months that are in a year. Similarly, if a data set had attributes for geographic location (e.g., address, zip code, city, county, state, country, etc.) the system can define relationship tables for different pairs of the attributes to indicate, e.g., which addresses are in different zip codes, which zip codes are in different cities, which cities are in different counties, and so on. A relationship table 320 thus can represent an index between two attributes. For example, the index can be in the form of a 1-to-M mapping, where one value for a first attribute (e.g., country) is mapped to M different values for a second attribute (e.g., states within a country). In some cases, when present in the data set, the relationship table 320 can indicate many-to-many relationships, where there may be multiple mappings between sets of values for different attributes.

The index pools 330 can provide data to support the lookup of information about metrics with respect to different attributes and combinations of attributes. Each index pool 330 can include managed indexes, related metric slices, a rowmap manager and managed rowmaps. An index pool can indicate how metric values relate to the attribute values. Where relationship tables 320 each typically relate attributes in the same type of dimension or hierarchy, the index pools 330 often relate attributes across multiple dimensions with metrics. For example, an index may enable a sales metric to be retrieved based on attributes values for a date and location. In the illustrated example, an index pool 330 "MainIndex(store,item,day)" includes data structures to return the values for one or more metrics (e.g., revenue, cost, etc.) corresponding to provided values of the store attributes, the item attribute, and the day attribute. The index can store values for the different combinations of attribute values (e.g., different combinations of values for store, item, and day attributes). Thus, by providing an identifier for a store, an identifier for an item, and a date, the index can return the corresponding metric values, e.g., the revenue for the specified item at the specified store on the specified date.

In some implementations, the lookup tables 320 and index pools are generated to operate together. For example, each lookup table 310 can store an offset value for each of the unique values of the attribute. The system can then look up the offset values for different data values to identify the offset values used to retrieve data from the index. For example, to retrieve the revenue value for sales of a cell phone yesterday at a New York City store, the system uses the lookup tables 310 to determine offsets for the New York City store (e.g., offset 10), the cell phone (e.g., offset 12), and yesterday (e.g., offset 1000). That results in a tuple, (10, 12, 1000), containing the offset values to retrieve the value of a metric. The indexes can represent information from the original data set, encoded or organized so that the offset values for different attributes can act as a pointer to the location where the corresponding metric value is stored. Rather than explicitly state the mappings of identifiers, the metrics can be stored so that data is ordered or organized so that the offset of 10 in a first dimension representing different stores leads to the data for the New York City store, within that store's data values stored at offset 12 in a second dimension representing different items correspond to the cell phone, and so on.

As part of generating the data cube 305, the system also generates and stores data describing the different objects or components of the data cube 305, and the system tracks which buffer or file represents each respective component. Typically, a main object or file for the data cube 305 stores data identifying each object within the data cube 305, and the server system 110 maps each object to a corresponding buffer or memory-mapped file.

The structure of the data cubes that are generated can be set to provide an appropriate level of granularity and to adjust how many memory-mapped files are generated for each data cube. When generating data cubes for memory-mapped usage, the number of data cube components (e.g., files) and thus memory-mapped files can be set to facilitate selectively loading of only portions of the data cube and also to facilitate quick and small updates to only portions of the data cube, while limiting the number of files to not burden the system with an overly large number of memory-mapped files to load and manage.

While it may be possible to include an entire data cube in a single memory-mapped file or just a few files, doing so would limit the ability of the system to selectively cache only currently relevant parts of the data cube (e.g., a small subset of the files) in system memory. As an example, rather than structuring a 1 TB data cube as ten 100 GB files, the system can structure the data cube as one thousand 1 GB files, allowing much more flexibility in the amount of RAM used at any given time (e.g., the ability to cache data cube content file-by-file in 1 GB increments rather than 100 GB increments). Organizing the data of the data cube into components by the types of data and relationships among the data also promotes effective caching.

For example, a data set may include information for 20 different attributes and metrics, but many operations performed may only use a few of the different attributes and metrics. By structuring the data cube with components that divide the storage of the data by type of data (e.g., with different components for different attributes or metrics, or for combinations of subsets of the attributes or metrics), the system can more easily selectively load and use only the components of the data cube that relate to the current or most common operations. In the example where there are 20 attributes or metrics, a user may desire to filter the data based on two attributes and generate a visualization of two additional metrics from the filtered data. With the data cube components created to store separate attributes or metrics and relationships between them, the filtering and visualization operations can be performed with the components related to the four attributes and metrics, while the remainder of the components of the data cube can be left unloaded.

It is also desirable for the system to be able to refresh a data cube after it is generated, by later adding, updating, or deleting data in a manner that affects only small part of the data cube, e.g., a small fraction of the total number of files that collectively represent a small fraction of the total size of the data cube. Forming a data cube of only a few very large files, or including mixed content of many different data types or object types within a file, increases the likelihood that a small, targeted update may involve changes to files representing a large amount of the total data cube content. The system takes a more efficient approach and divides data cube content into files that each include logically-related contents (e.g., data for a particular attribute or metric, or for a subset of attributes and metrics). As a result, updates for specific types of data or specific ranges of records can be made with changes to a small proportion of the files in the data cube. With this organization, most of the data cube files, representing the majority of the data cube content, can remain unchanged and can be reused in the updated cube without alteration. When setting the cube structure, the system also avoids an excessive number of memory-mapped files. In some cases, if the data cube is structured to divide the contents at very fine detail (e.g., in some cases with each data column or index object using a separate memory mapped file), this could result in tens of thousands of files or more and cause performance degradation for the operating system. If the number of memory-mapped files is too large, the overhead increases and may partially negate some of the performance benefits of memory mapping, by increasing tracking requirements, increasing the amount of system calls that need to be made, and otherwise decreasing performance.

The present system implements the performance advantages of memory mapping in a balanced way by structuring the data cube so that components each group logically-related data together, and by using a memory-mapped buffer to collect the content of each component as it is generated. This enables the system to achieve the versatility to make subsequent updates efficient after the data cube is completed, while keeping the number of memory-mapped files relatively small.

To provide high efficiency, the system structures the data cube into a number of components that achieves the benefits discussed above. Preferably, the data cube structure is divided into a significant number of files (e.g., often hundreds or thousands), with the content of the data cube divided among the files to logically group according to (1) the data type or semantic meaning of the data (e.g., by the particular attributes, metrics, data types, time ranges, transaction types, etc.) and/or (2) the role or function of the data in the data cube (e.g., as an index, as a look-up table, as raw data values, etc.). As discussed above, the server system 110 uses the initial analysis of the source data for the data cube to determine the types of data present, the amount and ranges of data present, the logical relationships among the source data, and more. The server system 110 can then specify the components to be included in the data cube based on the analysis. The server system 110 can use a set of predetermined rules to enumerate a components to generate, e.g., a column component for each column of tabular data (e.g., attribute or metric), a relationship table for each pair of attributes of metrics, an index for each attribute or metric, and so on. The system can also group together data for certain attributes or metrics by category to limit the number of components (and thus memory-mapped files) to a desired range. For example, when the number of attributes or metrics in the source data is above a threshold and would lead to greater than a desired target number of components, the system can group data for geographical attributes (e.g., address, city, state, country) may be together in a single component, group data for time-related attributes (e.g., time of day, date, etc.) together in a single component, etc.

In some implementations, the server system 110 stores and uses reference values or criteria for defining the data cube structure. For example, the server system 110 can store target levels or ranges for parameters such as: the number of components and thus memory-mapped files in the data cube (e.g., between 100 and 10,000); the average size of components (e.g., between 500 MB and 3 GB); the maximum size limit for a component (e.g., less than 50 GB, less than 10 GB, etc.); and so on. The system can store a set of rules for determining the default set of components to create, and then apply the rules to identify the set of components to create for the current data cube. The system can compare the resulting number of components with the thresholds defining the desired range for the number of components. If the number exceeds the maximum threshold, the system can alter the data cube organization to combine some elements together (e.g., group data for multiple semantically related data types in a single component, define components to include data for pairs or groups of attributes rather than single attributes) until the maximum threshold is satisfied. If the number of components is less than the minimum threshold, the system can alter the data cube organization to divide some components (e.g., splitting data for an attribute or metric into components for different ranges of records) until the minimum threshold is satisfied. Similarly, the system can estimate the sizes of the components to be generated based on the characteristics of the source data (e.g., data types, number of records, etc.). Components that are estimated to have sizes larger than the maximum threshold can be split into multiple components, while components that are estimated to have sizes less than the minimum threshold can be integrated with other components or otherwise be combined to reach the minimum.

Figure 4A:
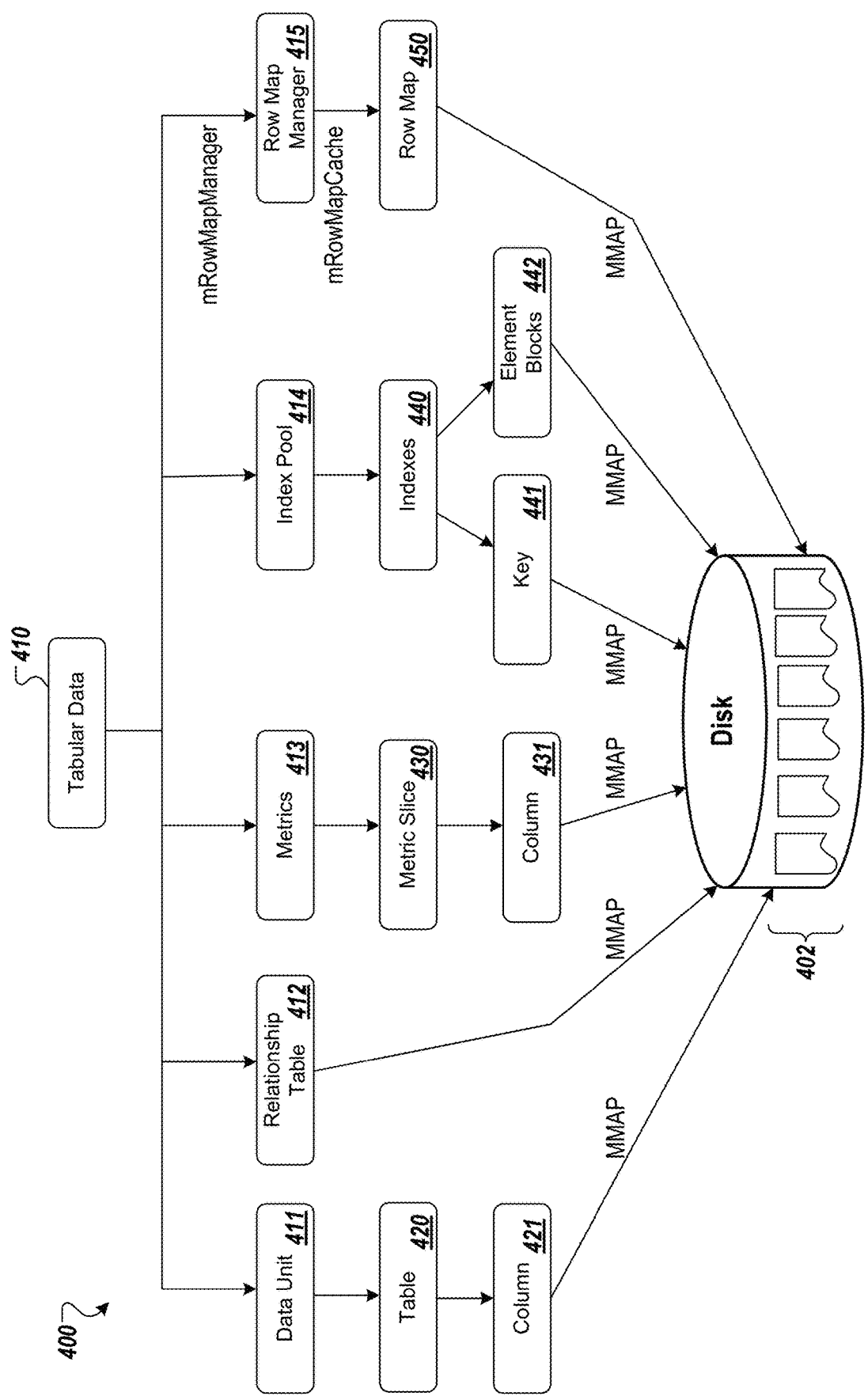
FIG. 4A is a diagram illustrating examples of types of data included in a data cube and mapping the data to memory mapped files.

FIG. 4A is a diagram illustrating examples of types of data included in a data cube and mapping the data to memory mapped files. The example shows how tabular data 410 can be processed into various different classes and sub-classes, which ultimately are stored in files 402 on disk. The example provides an example of classes and relationships that can be used set an element hierarchy 118 as discussed for FIG. 1.

A data cube can be based on tabular data 410, from which several major types of components can be generated, e.g., data units 411, relationship tables 412, metrics 413, index pools 414, and row map managers 415. Each of these classes may have one or more subclasses. For example, a data unit 411 can include several tables 420, each of which may include various columns 421. Similarly, metrics 413, can include metric slices 430, each of which may include one or more columns 431 of data. An index pool 414 can include multiple indexes 440, each of which can include one or more keys 441 and element blocks 442. A row map manager can include various row maps 450.

The different classes and subclasses shown in the example provide examples of elements of a data cube that are generated from a data warehouse. In the process of generating a memory mapped data cube, each instance of one of these classes can have a separate memory-mapped buffer assigned to accumulate the content for that data element. For example, each column 421 representing an attribute can have a separate buffer assigned to store values for the attribute, and the final set of data stored in the buffer can be stored as a file 402 that can be memory mapped when the data cube is loaded. Although not illustrated, the server system 110 can also store one or more additional files 402 that indicate relationships among the different files 402, e.g., specifying the overall structure of the data cube and indicating which files 402 represent which class types and which instances of those class types (e.g., indicating which files 402 represent attribute columns, and specifying for each which attribute has data stored in the file).

As discussed above, the server system 110 achieves high efficiency and versatility using a moderate amount of memory-mapped files, e.g., an amount within a predetermined target range (e.g., between 100 and 10,000, or between 500 and 5,000, etc.). The efficiency is facilitated by defining components that each include a particular type of data (e.g., localizing data for certain attributes and metrics in respective components) and based on the relationships among the different components of the data cube. Each memory-mapped file can be created for a subset of the data cube, where the data within the subset is related. The components of the data cube can also be defined according to the different functions the components provide.

Figure 4C:
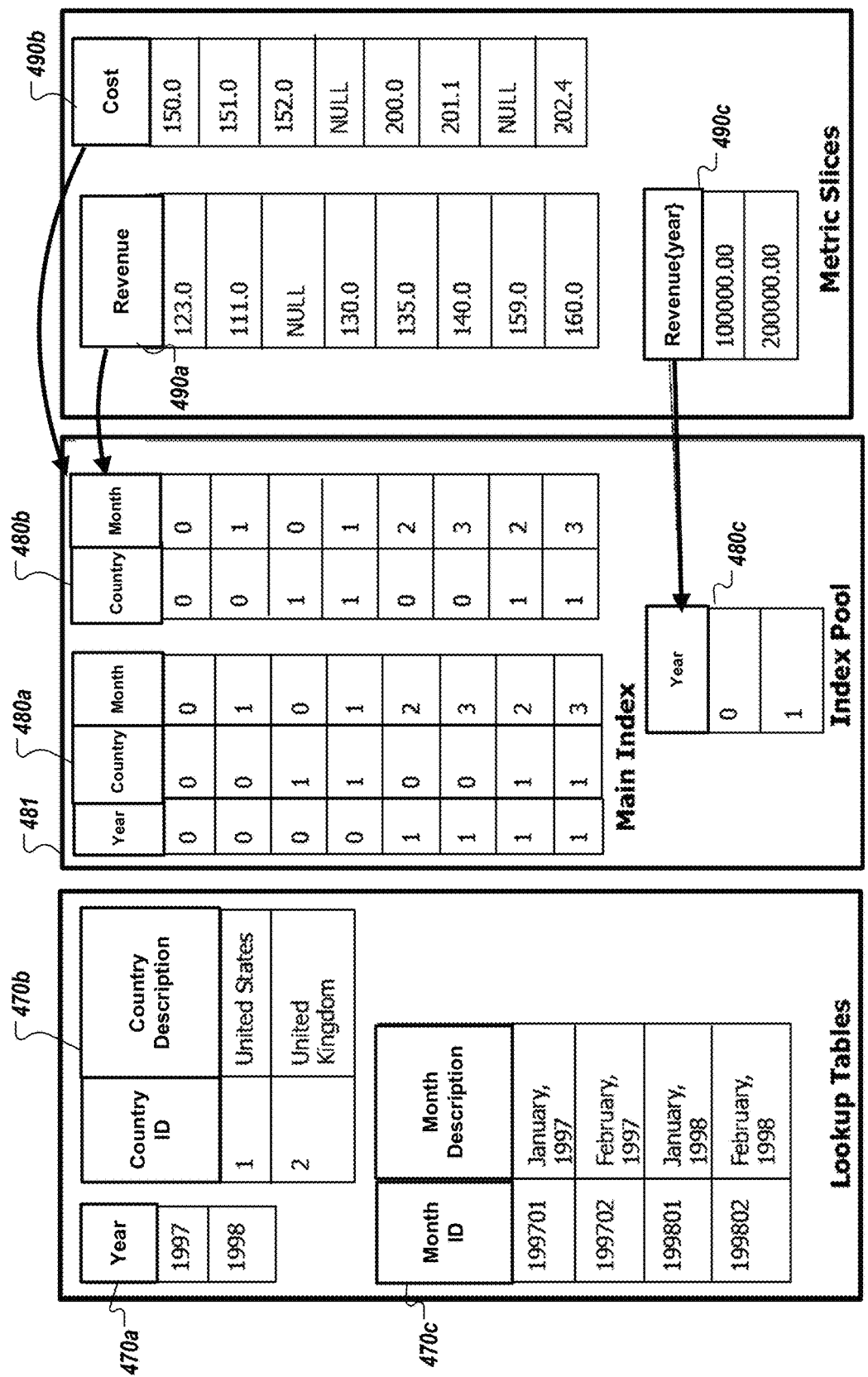
Figure 4D:
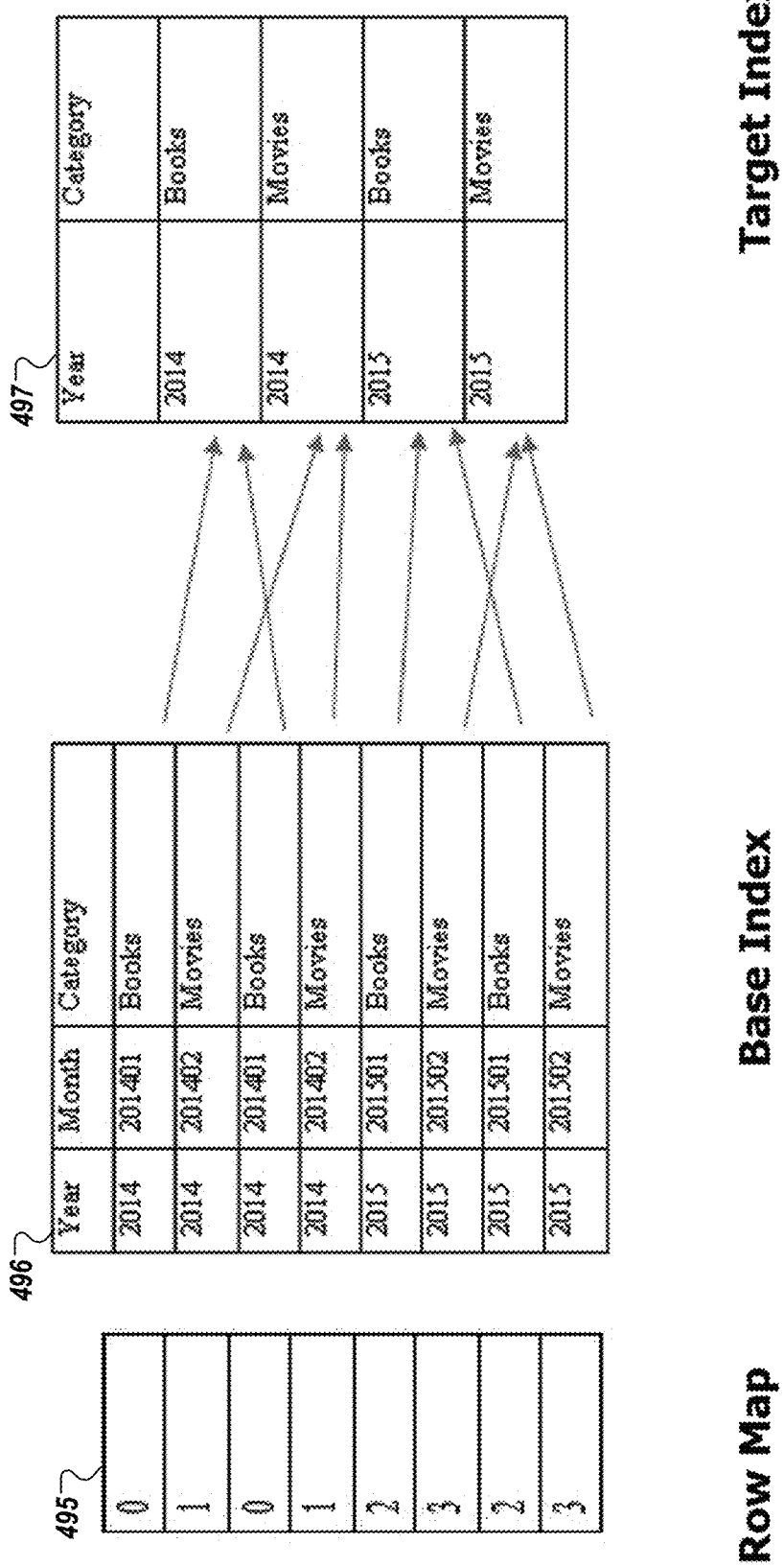

FIGS. 4B-4D show an example of data and components of a data cube. FIG. 4B shows a table 460 showing source data for creating a data cube. This example has values for three attributes, shown as columns for year, country (e.g., country ID and country description), and month (e.g., month ID and month description). The table 460 also shows three metrics, revenue, cost, and revenue by year.

FIG. 4C shows examples of various types of data that may be generated for a data cube based on the data in the table 460 of FIG. 4B. These include lookup tables 470a-470c, indexes 480a-480c in an index pool 481, and metric slices 490a-490c. The data cube may also include an fact table and one or more relationship tables that are not illustrated. The creation of a data cube for the data in FIG. 4B can begin by identifying the attributes and metrics present, determining the relationships among them, and designating the different components to be generated, such as lookup tables, indexes, index pools, metric slices, relationship tables.

The server system 110 can determine the components that are needed based on the number and types of attributes and metrics, and in some cases user preferences, by applying a set of rules that specify which types of components are stored in separate memory-mapped buffers. For example, the rules may specify that there is a lookup table for each attribute and that each lookup table 470a-470c is stored in a separate memory-mapped buffer, resulting in a separate memory-mapped file on completion of the data cube. Similarly, the rules can specify a relationship table for each pair of attributes corresponding to the same dimension (e.g., time, location, etc.), and a separate memory mapped file for each relationship table. The rules can specify a single fact table as a memory-mapped file. The rules can specify to create indexes for different combinations and sub-combinations of attributes, such as a main index for all attributes, and smaller indexes for subsets of attributes, allowing data at different levels of granularity. The indexes can be determined based on the granularity of metrics, so that the respective tables provide the granularity to lookup the metric values at the level they are stored in the data set. For example, the revenue and cost metrics have values by country and month, so an index 480b is generated for that level of granularity. Similarly, the revenue by year metric is at the granularity of a year, and so the index 480c is provided for retrieval by year.

The server system 110 may have different rule sets for generating data cubes, and may select different rule sets based on the properties of the source data. For example, the rules for dividing data cube components into separate memory mapped files may be different based on the number of records, amount of total data, the number of attributes, the number of metrics, and so on. For example, a rule set used for data sets with fewer attributes and metrics (e.g., 30 attributes and metrics or less) may split components in to more separate memory-mapped buffers or files than a rule set for data sets with more attributes and metrics (e.g., more than 30 attributes and metrics). As another example, parameters for splitting or combining data cube elements into different memory-mapped files may be changed based on the number of The different rule sets or different parameters, selected based on the properties of the source data, can be used to ensure that the resulting number of memory-mapped buffers or files is within the target levels desired.

In the example of FIG. 4C, there are three lookup tables 470a-470c that each correspond to a different attribute. The lookup tables indicate the various unique values for each attribute from the data in the table 460, and can relate identifiers with descriptions or other data. For example, the country attribute has two different values (e.g., two countries) and so the corresponding lookup table 470b has two entries. The lookup table 470b also specifies the correspondence between an identifier and the corresponding text description of the identifier.

The data cube also has an index pool including: a main index 480a, a second index 480b, and a third index 480c. The main index 480a relates all of the different attributes of year, county, and month. The values in the main index 480a refer to offsets or positions with respect to the values in the lookup tables. For example, in the year column, the value "0" corresponds to the first position in the year lookup table 470a which has a value of "1997." The is a reference to the first item in the lookup table, e.g., an index value representing the first entry in the lookup table 470a or an offset of zero from the beginning of the list of distinct values in the lookup table 470a. In the year column, the value "1" corresponds to the second position in the year lookup table 470a which has a value of "1998," so the value "1" represents an index value or offset for the second item in the lookup table 470a. There are similar values in the country and month columns that reference the items at different positions in the respective lookup tables 470b, 470c for those attributes. In the country column, the value of "0" corresponds to country ID 1/"United States" and the value "1" corresponds to country ID 2/"United Kingdom." Similarly, in the month column, the values of 0 to 3 correspond to the four months listed in the month lookup table 470c.

The other indexes 480b, 480c relate different subsets of the attributes together. The index 480b includes information relating only two attributes, country and month, out of the three attributes in the data cube. The index 480c includes information for only a single attribute, year. The set of indexes 480b, 480c to be generated can be determined based on the metrics in the data set and the granularity of those metrics. For example, the metrics for revenue and cost each specify values by country and month (e.g., different values are given for different combinations of country values and month values). As a result, the index 480b is provided, so that values can be retrieved at the appropriate granularity of country and month. For the metric of revenue by year, the granularity of data stored is only by year, and so the table 480c is generated to reference values by year.

In some implementations, a group of indexes that relate to a set of attributes (e.g., a main index for all attributes in the set and indexes for subsets of the attributes) can be stored together in an index pool 481, which can be stored as a single memory mapped file. Of course, in other implementations, indexes 480a-480c can alternatively be generated and stored as separate memory-mapped files. In some cases, different index pools are designated for different sets of attributes, based on the sets of attributes corresponding to different metrics. For example, if the source data includes a first set of metrics with respect to values of attributes (e.g., store ID, product ID, and date), and so a first index pool can be generated as a memory-mapped file. The source data may also include data for second metrics with values stored respect to another set of attributes (e.g., day, month, year, geographic region) that is different from the first set (but may or may not overlap with those of the first set). As a result, the system can generate a second index pool for this second set of metrics and related attributes.

The data cube also includes metric slices 490a-490c. Each metric slice 490a-490c stores the values of the metric for each combination of attributes represented in the source data. For example, in the table 460 there are eight different country/month combinations, and there is a revenue value and a cost value for each of those eight combinations. The metric slice 490a includes the eight values for the revenue metric and the metric slice 490b includes the eight values for the cost metric. For the revenue by year metric, the table 460 includes only values for two different years, and so the metric slice 490c has those two values.

The metric slices 490a-490c are used in connection with corresponding indexes in the index pool 480. The order in which the values appear in a metric slice aligns with the order of values in the corresponding index. For example, the first entry in the revenue metric slice 490a (e.g., "123.0") corresponds to the first row of the index 480b (and also the first row of index 480a). The values (0, 0) in the first row of the index 480b indicate the first value in the country attribute lookup table 470b (e.g., with index value or offset value of "0" representing ID 1/United States) and the first value in the month attribute lookup table 470c (e.g., with index value or offset of "0" representing ID 199701/January 1997). Similarly, in the eighth and final row of the index 480b, the values (1, 3) indicate that the corresponding eighth value in the metric slice 490a (e.g., "160.0") represents the revenue value for the attribute value combination of the second value in the country attribute lookup table 470b (e.g., with index value or offset of "1" representing ID 2/United Kingdom) and the fourth value in the month attribute lookup table 470c (e.g., with index value or offset of "3" representing ID 199802/February 1998). As a result, the indexes 480a-480c enable a computer system to retrieve the metric values for different combinations of attributes. For example, to determine, the revenue for the United States in January 1998, the system uses the lookup tables to determine the index or offset at which the these attribute values occur (e.g., offset values of 0 for United States and 2 for January 1998), finds the row representing this combination in the lookup table 480b (e.g., the fifth row has the (0, 2) values), and then retrieves the data from the corresponding row of the metric slice 490a (e.g., value "135.0").

In some implementations, the index pool 481, including each of the indexes 480a-480c, is combined in a single memory-mapped buffer or file for the data cube. The metric slices 490a-490c that relate to the indexes 480a-480c can be stored together in the same buffer or file as the indexes 480*a*-480*c*. This way, the metric slices 490*a*-490*c* and the related indexes 480*a*-480*c* used to retrieve values from the metric slices 490*a*-490*c* are stored together. Often, for a given fact table, all the metric slices and the index pool (including the maintained index objects) derived from the same fact table are stored in the same a memory mapped file. In other implementations, however, individual metric slices 490*a*-490*c* can be stored in separate memory-mapped buffers or files. Similarly, indexes 480*a*-480*c* may be stored in separate memory-mapped buffers or files in some cases.

Multiple metric slices can be accessed using the same index. The values in the index 480*b* can be used to determine the index value to look up values for the revenue metric or the cost metric. For example, values in the metric slices 490*a*, 490*b* are ordered so that a combination of attribute values corresponds to the same position in both metric slices 490*a*, 490*b*. The first row of index 480*b* (e.g., corresponding to tuple (0, 0) representing attribute values of United States and January 1997) also corresponds to the first rows of both metric slices 490*a*, 490*b* (e.g., revenue of "123.0" and cost of "150.0").

Although not illustrated, the system can also determine that year and month represent different granularity of the same dimension (e.g., time), and then create a relationship table that relates values of the month attribute to values of the year attribute (e.g., showing that the month IDs 199701 and 199702 are included in year 1997, and that month IDs 1998001 and 1998002 are included in year 1998). This table may be populated in the same manner as for indexes, but with all of the related attributes being for the same dimension. Other techniques for creating a relationship table can also be used, such as specifying groups of multiple values for a first attribute (e.g., offsets or index values within a lookup table for the first attribute) corresponding to one or more values of a second attribute. Each relationship table can be generated, stored, and used as a separate memory-mapped file.

FIG. 4D shows additional elements that can be generated and included in a data cube. The example shows a row map 495, a base index 496, and a target index 497. A row map 495 can be generated and stored to facilitate operations such as aggregation or filtering. The row map 495 can provide the relationships between two different index objects. For example, the row map 495 shows the relationships that map a first index of three attributes (e.g., the base index 496 for year, month, and category) to a smaller index of two attributes (e.g., the target index 497 for year and category). Different row maps can be generated to specify the row relationships between different index objects to accelerate filtering and data aggregation when the data cube is used. Row map objects and a row map manager object can be stored together in a memory-mapped buffer or file, either as a separate file or stored together with the index pool of having the indexes that the row map objects relate to.

Figure 5:
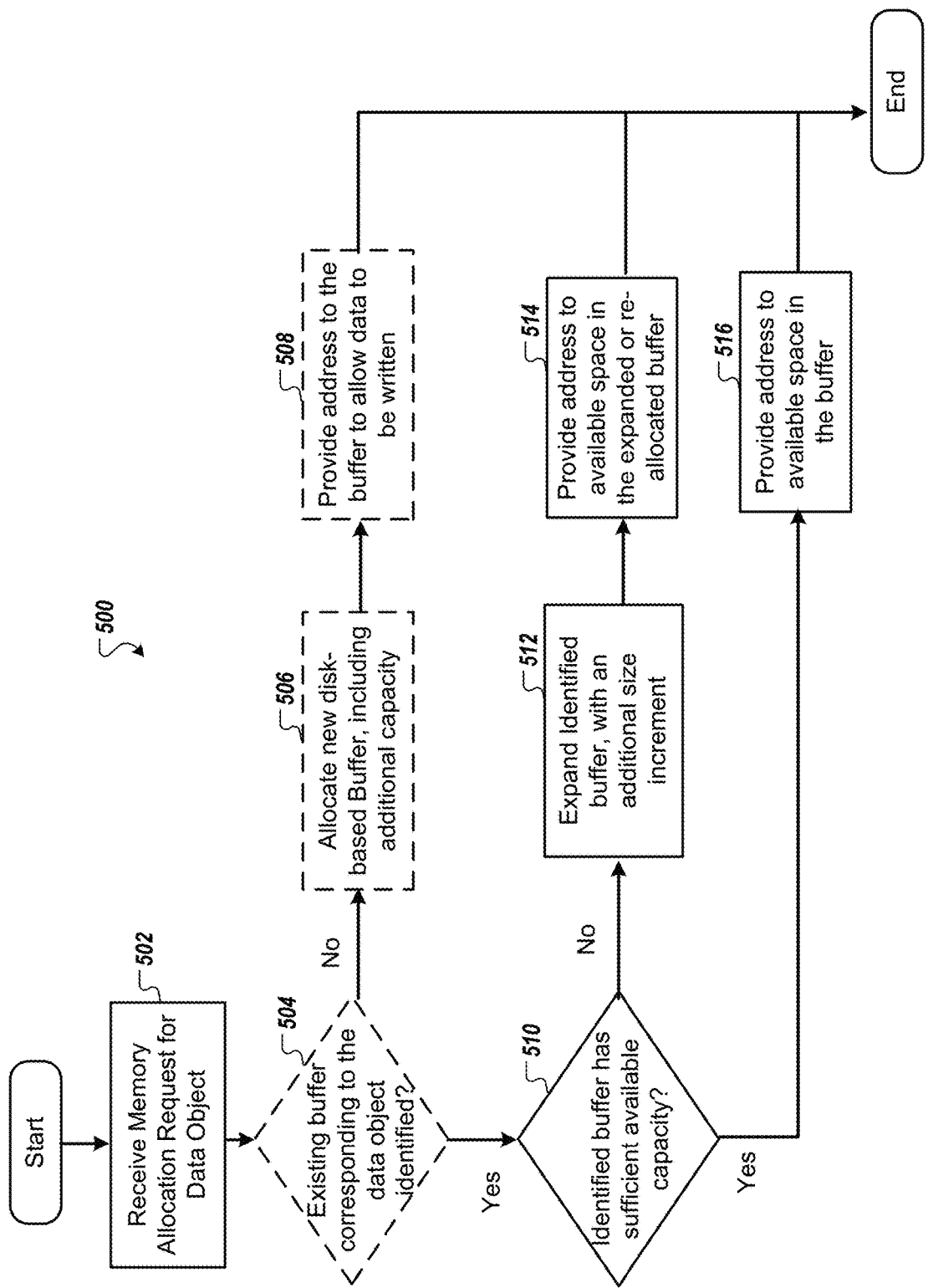
FIG. 5 is a flow diagram illustrating an example of a process for memory mapping data cubes.

FIG. 5 is a flow diagram illustrating an example of a process 500 for memory allocation using memory-mapped file buffers. The process shows operations that can be performed at least in part by the intermediate layer 116 in handling memory allocation requests during the generation of a data cube. The process 500 can be performed separately from and transparently to the analysis engine 115 that creates the data cube content. The process 500 enables the system to better accumulate logically-related data within each buffer. The analysis engine 115 indicates the data cube component for which allocation is desired and the intermediate layer 116 manages the memory-mapped buffers and allocates space within them.

The intermediate layer 116 receives a memory allocation request for a data object, which can be a piece of data in the data cube being generated (502). The request can indicate an amount of memory to allocate (e.g., 2 kB) and may be associated with a particular portion of the data cube (e.g., a particular attribute, metric, index, relationship table, or other element discussed with respect to FIGS. 3 and 4A-4D).

As discussed above, the server system 110 can identify each of the components of a data cube to be generated and can allocate disk-based buffers for each of those components at the beginning of the process for generating the data cube. Each component (e.g., file or object to be created for the data cube) has its own buffer allocated in advance. For a specific write operation, the buffer to be used for writing is chosen based on the data cube component to be written. Various techniques can be used to implement this. For example, when the buffers are initially allocated, the intermediate layer 116 can provide buffer identifiers (e.g., addresses or other identifiers) for the allocated buffers and the analysis engine 115 can store a buffer identifier for each data cube component. When data is ready to be written for a component, the memory allocation request that the analysis engine 115 sends may provide the buffer identifier for the data cube component in which the data is to be written. As an alternative, the memory allocation request may indicate the data cube component to be written (e.g., by providing a data cube component identifier), and the intermediate layer use a table or other stored data to identify the buffer for that data cube component.

Optionally, in some implementations, when a memory allocation request is received the intermediate layer 116 determines whether a memory-mapped, on-disk buffer corresponding to the data object exists (504). While some implementations allocate buffers for all data cube components in advance, other implementations may allocate buffers as access is requested. The intermediate layer 116 can associate data cube components with corresponding buffers (e.g., with stored data mapping component identifiers with buffer identifiers). When the request indicates a data cube component, the intermediate layer 116 can determine if an appropriate buffer exists by comparing a component identifier associated with the memory allocation request with component identifiers associated with the existing buffers. In some cases it may be beneficial for the analysis engine 115 to identify data cube components rather than buffer addresses. In this situation, the analysis engine 115 can use a consistent component identifier even if the intermediate layer 116 moves or changes the buffer (e.g., to another address, disk, etc.). If stored data indicates that an existing buffer is associated with the received component identifier, then the identified buffer is used. If the intermediate layer 116 does not identify an appropriate existing buffer for the component being written, the intermediate layer 116 allocates a new disk-based buffer (506). As discussed above, the initial size of the buffer is significantly larger than the requested size to be allocated. For example, if a page size is 4 kB and the requested size is 2 kB, the predetermined, default initial buffer size may be 40 kB (e.g., 10 pages), when only a single page would satisfy the allocation request. As part of the allocation, the intermediate layer 116 can provide a memory-mapped address for the buffer (508) to allow the analysis engine 115 to carry out writing for the data object. The analysis engine 115 then writes data for the data object to the location indicated by the provided address.

If the intermediate layer 116 identifies an existing buffer in step 504 (e.g., finding a buffer associated with the same identifier the memory request is associated with), then the intermediate layer 116 determines whether the identified buffer has sufficient available capacity to accommodate the new allocation request (510). In other words, the intermediate layer 116 determines the available (e.g., unused) amount of space in the identified buffer and compares the requested allocation amount with the amount of available space in the buffer.

If in step 510 the identified buffer does not have sufficient unused capacity available (e.g., 1 kB is free but 2 kB is requested), then the intermediate layer 116 expands the buffer or re-allocates the identified buffer to a larger size (512). This can be done be incrementing the size of the buffer by a predetermined amount. The predetermined amount can be significantly larger than the amount requested or the additional amount needed to provide the amount requested. The increment size can be much more than the average write request size (e.g., 40 kB or 10 pages, when mean or median allocation requests are 2 kB or only one page). As an example, if an existing buffer has a size of 40 kB, 39 kB of the space is used, and the request is for 2 kB to be allocated, the intermediate layer 116 can re-allocate the buffer to increment the size by 40 kB. This results in a buffer with a size of 80 kB, of which 41 kB would be occupied once the current memory allocation is made. The intermediate layer 116 then provides a memory-mapped address to a portion of the available space in the buffer.

The intermediate layer can track and maintain a record of which portions of each buffer are filled and which are empty and available to receive additional data. In some implementations, the system 110 can be configured to add content to each individual buffer sequentially, so that new data for a buffer is appended at the end of the previously written data in the buffer. As new data is added, the intermediate layer can store an address or pointer for the section of the buffer where available (e.g., empty) space begins as well as data such as the amount of remaining available space.

If in step 510 the identified buffer is determined to have at least as much free space as is requested in the memory allocation request, then the intermediate layer 116 can make the allocation within the identified buffer without changing the buffer. The intermediate layer 116 provides an address to a free portion of the buffer (e.g., an address for the next location after the used portion), so the analysis engine 115 can write data to the buffer.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    accessing a data set comprising data to be processed into a data cube;
    generating a memory-mapped data cube based on the data set, the memory-mapped data cube comprising a plurality of files including different segments of the data cube, wherein generating the memory-mapped data cube comprises:
        allocating memory-mapped buffers in non-volatile data storage in response to first memory allocation requests, wherein the memory-mapped buffers each allocate extra capacity such that the buffer exceeds an allocation size indicated in the corresponding first memory allocation request;
        after allocating the memory-mapped buffers and writing first components of the data cube in the memory-mapped buffers, responding to second memory allocation requests by providing addresses for locations in the extra capacity of the buffers;
        based on the provided addresses, writing second components of the data cube to the memory-mapped buffers; and
        storing contents of the respective buffers as files of the data cube; and
    loading the memory-mapped data cube by storing the files of the data cube in disk-based storage, mapping the stored files of the data cube to virtual memory addresses, and caching portions of the data cube in random-access memory.

2. The method of claim 1, wherein the data cube is an online analytical processing (OLAP) data cube or a multi-table data import (MTDI) data cube.

3. The method of claim 1, comprising adjusting the portions of the data cube that are cached based on accesses to the data cube over a period of time.

4. The method of claim 1, wherein caching portions of the data cube in random-access memory comprises caching sub-file portions of the files of the data cube.

5. The method of claim 4, wherein caching portions of the data cube in random-access memory comprises performing page-level caching of the files of the data cube.

6. The method of claim 1, wherein caching portions of the data cube in random-access memory comprises selectively caching individual files of the data cube based on an access history for the files in the data cube.

7. The method of claim 1, wherein the memory-mapped buffers have initial sizes that are more than double the allocation sizes requested in the first memory allocations.

8. The method of claim 1, comprising:
    determining that, for a particular request of the second memory allocation requests, a requested allocation size exceeds an amount of available capacity in a memory-mapped buffer identified for handling memory allocation for the particular request;
    expanding the identified memory-mapped buffer by a predetermined increment that exceeds the requested allocation size; and
    after expanding the identified memory-mapped buffer, providing an address in the expanded buffer in response to the particular request.

9. A system comprising:
one or more computers; and
one or more computer-readable media storing instructions that are operable, when executed by the one or more computers, to cause the one or more computers to perform operations comprising:
accessing a data set comprising data to be processed into a data cube;
generating a memory-mapped data cube based on the data set, the memory-mapped data cube comprising a plurality of files including different segments of the data cube, wherein generating the memory-mapped data cube comprises:
   allocating memory-mapped buffers in non-volatile data storage in response to first memory allocation requests, wherein the memory-mapped buffers each allocate extra capacity such that the buffer exceeds an allocation size indicated in the corresponding first memory allocation request;
   after allocating the memory-mapped buffers and writing first components of the data cube in the memory-mapped buffers, responding to second memory allocation requests by providing addresses for locations in the extra capacity of the buffers;
   based on the provided addresses, writing second components of the data cube to the memory-mapped buffers; and
   storing contents of the respective buffers as files of the data cube; and
loading the memory-mapped data cube by storing the files of the data cube in disk-based storage, mapping the stored files of the data cube to virtual memory addresses, and caching portions of the data cube in random-access memory.

10. The system of claim 9, wherein the data cube is an online analytical processing (OLAP) data cube or a multi-table data import (MTDI) data cube.

11. The system of claim 9, comprising adjusting the portions of the data cube that are cached based on accesses to the data cube over a period of time.

12. The system of claim 9, wherein caching portions of the data cube in random-access memory comprises caching sub-file portions of the files of the data cube.

13. The system of claim 12, wherein caching portions of the data cube in random-access memory comprises performing page-level caching of the files of the data cube.

14. The system of claim 9, wherein caching portions of the data cube in random-access memory comprises selectively caching individual files of the data cube based on an access history for the files in the data cube.

15. The system of claim 9, wherein the memory-mapped buffers have initial sizes that are more than double the allocation sizes requested in the first memory allocations.

16. The system of claim 9, comprising:
determining that, for a particular request of the second memory allocation requests, a requested allocation size exceeds an amount of available capacity in a memory-mapped buffer identified for handling memory allocation for the particular request;
expanding the identified memory-mapped buffer by a predetermined increment that exceeds the requested allocation size; and
after expanding the identified memory-mapped buffer, providing an address in the expanded buffer in response to the particular request.

17. One or more non-transitory computer-readable media storing instructions that are operable, when executed by the one or more computers, to cause the one or more computers to perform operations comprising:
accessing a data set comprising data to be processed into a data cube;
generating a memory-mapped data cube based on the data set, the memory-mapped data cube comprising a plurality of files including different segments of the data cube, wherein generating the memory-mapped data cube comprises:
   allocating memory-mapped buffers in non-volatile data storage in response to first memory allocation requests, wherein the memory-mapped buffers each allocate extra capacity such that the buffer exceeds an allocation size indicated in the corresponding first memory allocation request;
   after allocating the memory-mapped buffers and writing first components of the data cube in the memory-mapped buffers, responding to second memory allocation requests by providing addresses for locations in the extra capacity of the buffers;
   based on the provided addresses, writing second components of the data cube to the memory-mapped buffers; and
   storing contents of the respective buffers as files of the data cube; and
loading the memory-mapped data cube by storing the files of the data cube in disk-based storage, mapping the stored files of the data cube to virtual memory addresses, and caching portions of the data cube in random-access memory.

18. The one or more non-transitory computer-readable media of claim 17, wherein the data cube is an online analytical processing (OLAP) data cube or a multi-table data import (MTDI) data cube.

19. The one or more non-transitory computer-readable media of claim 17, comprising adjusting the portions of the data cube that are cached based on accesses to the data cube over a period of time.

20. The one or more non-transitory computer-readable media of claim 17, wherein caching portions of the data cube in random-access memory comprises caching sub-file portions of the files of the data cube.

* * * * *